United States Patent
Butts et al.

(10) Patent No.: US 6,467,153 B2
(45) Date of Patent: *Oct. 22, 2002

(54) METHOD FOR MANUFACTURING A DISK DRIVE

(75) Inventors: William Orson Butts, Anaheim Hills; Mostafa Pakzad, Verdes Peninsula; Mohammad Sarraf, Trabuco Canyon, all of CA (US)

(73) Assignee: Western Digital Technologies, Inc., Lake Forest, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/873,230

(22) Filed: Jun. 11, 1997

(65) Prior Publication Data

US 2002/0040518 A1 Apr. 11, 2002

(51) Int. Cl.⁷ .......................... G11B 5/455; G11B 5/127

(52) U.S. Cl. ............................ 29/603.03; 29/603.09; 29/593; 324/210; 324/212; 324/760

(58) Field of Search ................... 29/603.03, 603.09, 29/593; 324/210, 212, 754, 771, 158.1, 73.1, 760; 73/865.9

(56) References Cited

U.S. PATENT DOCUMENTS

| | | | | |
|---|---|---|---|---|
| 4,434,489 A | * | 2/1984 | Blyth | 324/73.1 |
| 4,754,397 A | * | 6/1988 | Varaiya et al. | 360/133 |
| 4,949,036 A | * | 8/1990 | Bezinque et al. | 324/212 |
| 4,953,277 A | * | 9/1990 | Crispin et al. | 29/593 |
| 4,967,155 A | * | 10/1990 | Magnuson | 324/212 |
| 5,194,691 A | * | 3/1993 | McIlwraith | 361/818 |
| 5,551,145 A | * | 9/1996 | Jurgenson | 29/603.03 |
| 5,553,086 A | * | 9/1996 | Sompel et al. | 371/147.1 |
| 5,557,559 A | * | 9/1996 | Rhodes | 324/765 |
| 5,589,777 A | * | 12/1996 | Davis et al. | 324/210 |
| 5,661,615 A | * | 8/1997 | Waugh et al. | 360/75 |
| 5,668,477 A | * | 9/1997 | Mahmoudian et al. | 324/210 |
| 5,706,080 A | * | 1/1998 | Pekin et al. | 324/73.1 |

* cited by examiner

Primary Examiner—Peter Vo
Assistant Examiner—A. Dexter Tugbong
(74) Attorney, Agent, or Firm—Milad G Shara, Esq.

(57) ABSTRACT

A method for manufacturing a disk drive includes assembling the head disk assembly in a clean room, performing servo writing upon the head disk assembly in the clean room, and performing a head disk assembly test upon the head disk assembly in the clean room. The head disk assembly is then connected to the controller printed circuit board assembly to form a drive-under-test. The drive-under-test is then transported to an integrated test system and electrically connected thereto. The integrated tests system then performs substantially all of the required manufacturing tests upon the drive-under-test, thereby substantially reducing the labor and floor space associated therewith.

5 Claims, 14 Drawing Sheets

METHOD FOR MANUFACTURING A DISK DRIVE

FIELD OF THE INVENTION

The present invention relates generally to disk drive manufacturing methodology and more particularly to an improved method for manufacturing a disk drive wherein an integrated test system substantially reduces the labor involved in disk drive manufacturing and also substantially reduces the floor space required therefor. The improved method for manufacturing a disk drive also facilitates the application of statistical process control, so as to further enhance the efficiency of the manufacturing process.

BACKGROUND OF THE INVENTION

Magnetic disk drives, such as those used for mass storage in personal computer systems, are well known. Referring to FIG. 14, a disk drive 162 comprises a head disk assembly (HDA)160 and a controller printed circuit board assembly (PCBA) 161. The HDA 160 comprises a cover 166, a base 167, one or more disks 165, a head stack assembly 163 for rotatably positioning a transducer 169 over a disk 165, and a spindle motor 164 for spinning the disks 165. The controller PCBA 161 comprises the electronic elements necessary to effect the writing of data upon the disks and the reading of data therefrom and for controlling the spindle motor 164 and the position of transducer 169 supported by head stack assembly 163.

The manufacturing of a disk drive comprises the separate fabrication and preliminary testing of the HDA 160 and the controller PCBA 161, which are subsequently mated and subjected to additional testing. This process is discussed in further detail below.

After HDA 160 has been fabricated, then servo writing is performed by securing HDA 160 to servowriter (not shown) in a well known process. During servo writing, servo information is written upon a surface of the disk 165. The servo information facilitates the precise positioning of transducer 169 over disk 165 during read and write processes.

After servo writing has been accomplished, HDA 160 is tested to preliminarily verify the validity of the servo information written upon disk 165. At this time an overlay is typically written to the disk to facilitate the later performance of an intelligent burn-in (IBI) test. A unique identification number is preferably also written to the disk at this time, so as to facilitate accurate tracking of the disk drive during the subsequent manufacturing processes. A bar code identification sticker may optionally be applied to HDA 160 as well.

Since the controller PCBA 161 has not yet been mated to the HDA 160, the above processes are performed utilizing non-deliverable electronics, i.e., electronics which are part of the test apparatus and which remain with the test apparatus. Servo writing and servo validity testing are performed within a clean room since the hard disk has not yet been environmentally sealed.

As mentioned above, the controller PCBA 161 is manufactured and tested separately from the HDA 160. Prior to leaving the clean room, the HDA 160 is environmentally sealed. Then typically outside the clean room, HDA 160 is mated to previously tested controller PCBA 161 so as to form a drive-under-test 162.

After leaving the clean room, a plurality, typically twenty-four, of such drives-under-test 162 are then loaded onto a tray. The tray provides for the mechanical attachment and the electrical connection of the drives-under-test 162 thereto, so as to facilitate simultaneous testing thereof. Thus, each individual drive-under-test 162 is electrically connected to the tray, then the tray is electrically connected to a test apparatus.

Once connected to the test apparatus, a power-on test is performed and then each drive-under-test 162 is checked to verify that it is ready for operation. Next, the basic operation of the drive-under-test 162 is checked. This includes testing each drive-under-test 162 for the proper performance of basic writing, reading, and seeking operations. The power-on test, drive ready test, and basic operational tests are referred to collectively herein as the initial drive test (IDT).

After successfully passing the IDT, each drive-under-test 162 is subjected to an intelligent burn-in (IBI). The IBI is preferably performed within an environmental chamber so as to facilitate testing at different temperatures, such as at ambient temperature and at 40-50° C. The drive-under-test 162 test is conventionally performed by the drive as a stand-alone function, i.e. without connection to a host computer, because of its length and the relative scarcity of host connections available in prior art manufacturing installations. The IBI typically commences with a shortened version of the IDT, so as to verify basic functionality of the drive at both ambient and elevated temperatures. Next, a lengthy process comprising calibration of the drive and defect discovery and management is performed to set operating parameters and identify and map media defects which would affect the ability of the media to store information thereon reliably. Next, the drive-under-test 162 is formatted and the results of the IBI are stored thereon. Typically, 360 drives-under-test are subjected to the IBI simultaneously.

After successfully passing the IBI, each drive-under-test 162 is subjected to a final test. Final testing comprises connecting the drive-under-test 162 to a host computer, verifying operation of host commands, and analyzing the IBI test results and validating the same. Desired performance characteristics of the drive, such as head seek time, may be verified if desired. The IBI overlays are typically removed at this time, so as to prevent the drive from inadvertently being placed in the IBI mode by a customer. Any desired overlays, such as those required by a specific customer, for example, are written to the drive-under-test 162.

Various other tests may be performed on an individual drive-under-test 162 during a debug process when a fault is found during routine testing. Such debug tests are performed to isolate the fault, so as to facilitate the correction thereof. For example, a drive-under-test 162 may fail the disk write portion of the IDT and then have the problem isolated to a particular head assembly during the debug process.

Although the above-described manufacturing procedure has been found generally suitable for the production of reliable disk drives, it does possess inherent deficiencies which detract from the overall desirability thereof. For example, the IDT, the IBI, and the final test are each performed at separate stations. The use of such separate stations inherently requires substantial handling of the disk drives to move them from one test station to another. It also requires substantial floor space within the manufacturing facility to accommodate the necessary test equipment.

As those skilled in the art will appreciate, the handling of disk drives as they are transported between test stations is undesirable since it inherently lengthens the time required for the manufacturing process and also since costly manpower is required to facilitate such handling. This is of particular concern since disk drives are frequently manufactured overseas in areas where unemployment is very low and thus such workers may be difficult to find or retain during periods of expansion. Further, handling inherently increases the risk of damage to disk drives. For example, the drives may be subjected to shock or electrostatic discharge (ESD) damage, connectors may be misaligned, etc., during such handling. Such damage frequently necessitates costly re-work of the disk drive, further undesirably increasing the cost of manufacture thereof.

As those skilled in the art will further appreciate, it is desirable to minimize the amount of floor space required for any particular process within a manufacturing facility, so as to decrease the costs associated therewith. Such costs include the acquisition or lease cost of the space itself, as well as the cost of heating, cooling, cleaning, etc. associated with such space. Additionally, floor space is frequently the limiting factor affecting manufacturing capacity. Thus reducing the floor space required for a particular manufacturing process frequently results in increased manufacturing capacity.

The use of statistical process control to enhance the efficiency of various different manufacturing processes is also well known. Statistical process control facilitates the isolation of faulty manufacturing processes by statistically analyzing problems which are found in manufactured items. Such statistical analysis typically comprises the tabulation of specific problems and the comparison of the tabulation to pre-specified norms. When the actual incidence of a particular problem exceeds its expected norm, then steps are typically taken to correct the appropriate manufacturing process.

Further, when a plurality of substantially identical manufacturing processes are involved, then each manufacturing process may be compared to the others, rather than to pre-specified norms. For example, if a particular disk drive comprises six head assemblies, each associated with a particular disk surface, then the incidence of failure of a given head assembly may reasonably be expected to be approximately equal to that of the average of the remaining head assemblies. The observation of a higher than expected failure rate of a given head assembly, as thus compared to the average of the failure rates of the remaining head assemblies, indicates the need for corrective action.

As those skilled in the art will appreciate, the use of such statistical process control may potentially provide a substantial cost savings by substantially reducing the number of items which are manufactured improperly, thus requiring costly re-work.

As such, it is desirable to provide a method for manufacturing disk drives which substantially reduces the labor involved in the manufacturing process and which also substantially reduces the floor space required therefor. It is also desirable to isolate and correct faulty manufacturing processes as quickly as possible.

SUMMARY OF THE INVENTION

The present invention specifically addresses and alleviates the above-mentioned deficiencies associated with the prior art. More particularly, the present invention comprises a method for manufacturing a disk drive. The disk drive comprises a head assembly and a controller PCBA. The method comprises the steps of assembling a head disk assembly in a clean room, performing a head disk assembly test upon the head disk assembly in the clean room, connecting the head disk assembly to the controller printed circuit board assembly to form a drive-under-test, transporting the drive-under-test to an integrated test system and electrically connecting the drive-under-test to the integrated test system. Substantially all of the required manufacturing tests are performed upon the drive-under-test while the drive-under-test remains electrically connected to the integrated test system. These manufacturing tests comprise an initial drive test, an intelligent burn-in test, and a final test.

According to the preferred embodiment, the present invention further comprises the steps of monitoring the drive-under-test with a host computer while it is connected to the integrated test system and modifying an earlier performed manufacturing process when an indication is received by the host computer that the earlier performed manufacturing process is being performed improperly. This may be accomplished by analyzing statistical data resulting from the testing of many disk drives. An earlier performed manufacturing process may also be modified based upon the test results from a single drive, where those test results indicate the need for such modification.

Thus, statistical process control is utilized to provide an early indication that a particular manufacturing process is being performed improperly. The early detection and correction of such a faulty manufacturing process may potentially prevent the manufacture of a large number of faulty disk drives, particularly in high volume manufacturing facilities. As those skilled in the art will appreciate, the re-work of disk drives manufactured having an unacceptable defect due to a flawed manufacturing process can be extremely expensive.

Re-work of such improperly manufactured disk drives, if even possible, tends to be labor intensive, and therefore extremely costly. For example, if it is found that a number of drives have been manufactured with one defective head, then all of those drives must be disassembled, reassembled with a new head in place of the defective one, inspected, and retested.

A unique identification code is preferably written to the drive-under-test, preferably during head disk assembly testing. The identification code is used to determine which of a plurality of different manufacturing processes have been performed upon a particular drive-under-test, so as to facilitate modification of one of the manufacturing processes when an indication is received that one of the manufacturing processes is being performed improperly. Thus, the use of such a unique identification code facilitates easy identification of a particular manufacturing process, particularly when the plurality of such manufacturing processes are being performed simultaneously, i.e., in parallel with one another, i.e., simultaneously. Thus, the identification code facilitates the identification, for example, of the particular assembly line upon which the drive was fabricated.

The head disk assembly test preferably comprises verifying the validity of the servo writing process and writing intelligent burn-in overlays to the drive-under-test.

The initial drive test preferably comprises a power-on test, a check for drive ready, and a basic operational check of the writing, reading, and seeking processes.

The intelligent burn-in preferably comprises a check of the basic functionality of the drive-under-test, defect discovery and management, formatting of the drive-under-test, and writing of the burn-in test results onto the drive-under-test.

At least a portion of the intelligent burn-in is preferably performed with the drive-under-test at a temperature of between approximately 40° C. at approximately 50° C. Any of the tests performed while a drive-under-test is connected to the integrated test system may easily be performed under desired environmental conditions, e.g., at a desired temperature, since the integrated test system may easily be contained within an environmentally controlled facility and/ or the integrated test system may optionally comprise an integrated environmental control system.

The final test preferably comprises analyzing and validating results of the intelligent burn-in, verifying performance characteristics of the drive-under-test 162, removing the intelligent burn-in overlays and writing any desired customer-specific overlays to the drive-under-test.

The step of electrically connecting the drive-under-test to the integrated test system comprises applying power to the drive-under-test, electrically setting jumpers upon the drive-under-test, and providing an electrical path for the communication of commands and data between the drive-under-test and the integrated test system. Alternatively, the jumper settings may be manually set prior to electrical connection of the drive-under-test 162 to the integrated test system. However, as those skilled in the art will appreciate, electrically setting jumpers upon the drive-under-test facilitates easy testing of the drive with different jumper settings, thereby enhancing the scope and effectiveness of such testing.

According to the preferred embodiment of the present invention, the step of connecting the head disk assembly to the controller printed circuit board assembly is performed outside of the clean room. Alternatively, the head disk assembly may be connected to the printed circuit board assembly inside the clean room.

The method for manufacturing a disk drive of the present invention thus substantially reduces the labor involved in disk drive manufacturing and also substantially reduces the floor space required therefor, as discussed in detail below. The present invention also facilitates the use of statistical process control, as also discussed in detail below.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 7 is a flow chart depicting the steps performed during intelligent burn-in;

DETAILED DESCRIPTION OF THE PREFERRED EMBODIMENT

The detailed description set forth below in connection with the appended drawings is intended as description of the presently preferred embodiment of the invention and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
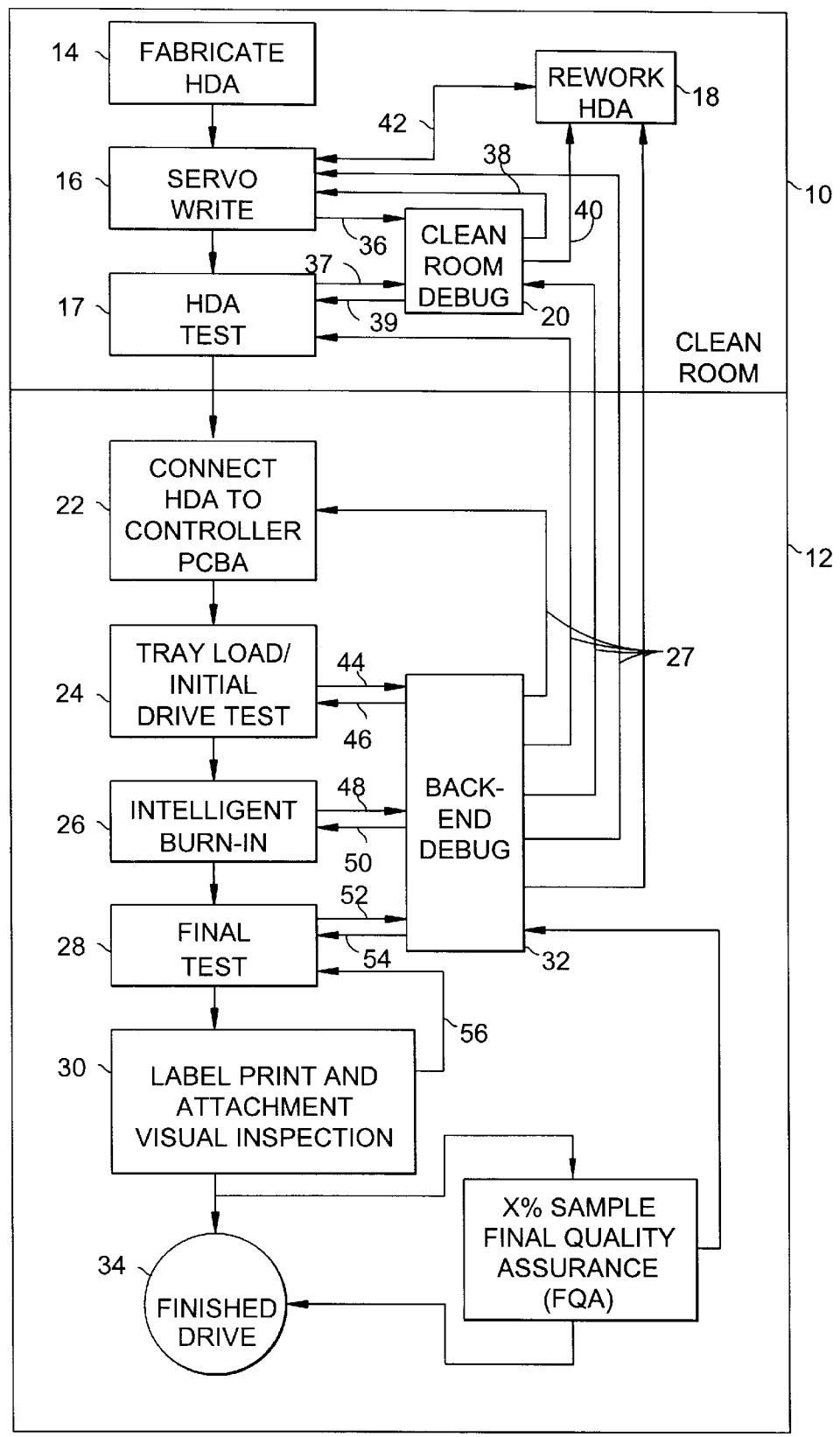
FIG. 1 is a flow chart depicting contemporary disk drive manufacturing methodology.

The method for manufacturing a disk drive of the present invention is illustrated in FIGS. 2–13, which depict a presently preferred embodiment thereof. FIG. 1 depicts contemporary manufacturing methodology.

In the following discussion, the manufacture of a single hard disk will usually be described. As those skilled in the art will appreciate, a hard disk drive manufacturing facility typically comprises at least one assembly line wherein the below described processes occur in a generally continuous fashion upon a large number of disk drives. Indeed, a plurality of such assembly lines may operate in parallel.

Referring now to FIG. 1, according to contemporary methodology, a HDA 160 is fabricated 14 within a clean room 10. The HDA 160 is fabricated within the clean room 10 so as to mitigate undesirable contamination thereof. As those skilled in the art will appreciate, such contamination, particularly of the heads, disks and drive mechanism thereof, may adversely affect the performance of the drive.

After the HDA 160 is fabricated 14, then servo writing 16 is performed thereon. During the servo writing process 16, servo tracks are written to at least one of the surfaces of a disk so as to facilitate precise alignment of the head assembly relative to the disks during data read and write processes.

Problems which occur during the servo writing 16 process result in the disk drive being subjected 36 to clean room debug 20 where diagnostic procedures and minor repairs occur. A repaired disk drive is then transferred 38 back to the servo writing process 16. Occasionally, it may be necessary to subject 40 the HDA 160 to re-work 18. The re-worked HDA 160 is then again transferred 42 to servo writing 16.

After successful completion of the servo writing 16 process, the HDA 160 test 17 is performed. During the HDA 160 test 17, the HDA 160, without a deliverable controller PCBA 161 attached thereto, is tested to verify that the servo writing 16 process was performed properly. Then IBI overlays are written to the disk drive for use in the subsequent IBI 26.

If a problem occurs during HDA 160 testing 17, then the HDA 160 is subjected 37 to the clean room debug 20 for diagnosis and repair thereof. The repaired disk drive is then transferred 39 back to HDA 160 test 17.

Upon the completion of successful HDA 160 testing 17, the HDA typically leaves the clean room 10 and is mated to a controller PCBA 161 at 22 outside 12 of the clean room 10.

Next, at 24 the disk drive is loaded onto a tray and the IDT is performed. The tray is then electrically connected to a power supply and a tester, typically comprising one or more personal computers.

If a problem occurs during the IDT 24, then the drive is transferred 44 to backend debug 32 where diagnostics and repair are performed. After the disk drive has been repaired it is transferred 46 back to the IDT 24.

The IDT 24 comprises a power-on test and a check for drive ready. Then, basic operational checks for writing, reading, and seeking are performed.

Upon successful completion of the IDT 24, the drive is subjected to IBI 26 during which a shortened version of the IDT is performed to verify the basic functionality of the drive. Then, defect discovery and management is performed upon the disk drive. During defect discovery and management product dependent tests are performed to locate and map out all media defects. Next, the disk drive is formatted and the results of the IBI tests are stored in the reserved cylinders thereof. IBI is typically performed upon 360 disk drives simultaneously within a given test apparatus setup.

If a problem occurs during the IBI 26, then the drive is transferred 48 to backend debug 32 where diagnostics and repair are performed. After the disk drive has been repaired, it is transferred 50 back to the IBI 26.

After successful completion of the IBI 26, the final test 28 is performed. The final test 28 comprises analyzing the IBI test results and validating the same. Various performance characteristics of the disk drive may be verified, dependent upon the product and the customer specifications. The IBI overlays are removed so as to prevent the disk drive from ever entering the IBI test in the future. If any customer-specific overlays are desired, then they are typically loaded at this time. The final test is typically performed upon ten disk drives simultaneously.

If a problem occurs during the final test 28, then the disk drive is subjected 52 to backend debug 32 for diagnostics and repair. The repaired disk drive is then transferred 54 back to final test 28.

As a result of backend debug 32, various modifications 27 to various steps of the manufacturing process may be performed. For example, it may become apparent during backend debug 32 that the HDA 160 test 17 needs to be modified so as to more reliably detect a particular type of defect in the HDA 160.

After successful completion of the final test 28, then inspection 30 of the disk drive is performed. If the disk drive fails inspection 30, then it is again subjected 56 to the final test 28.

After successful completion of an inspection 30, the finished drive 34 is packaged and ready for delivery to a customer.

It is important to remember that in the prior art process of FIG. 1, each of the separate backend tests, i.e., tray load/IDT 24, IBI 26 and the final test 28, take place at separate test stations which occupy substantial floor space. The use of such separate test stations necessitates substantial undesirable handling of the disk drives, so as to effect transport therebetween and so as to facilitate electrical connection to each test station.

Figure 2:
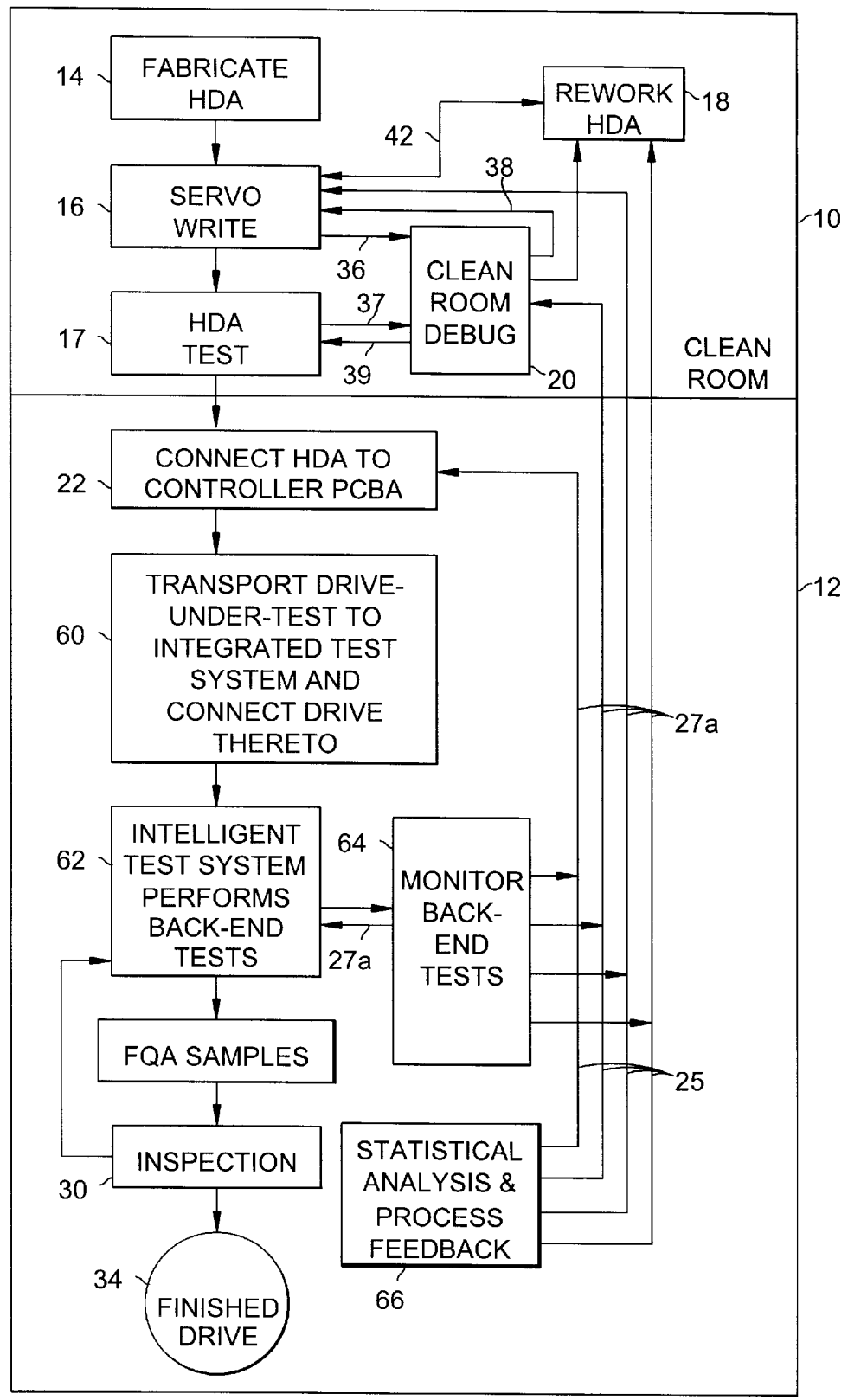
FIG. 2 is a flow chart depicting disk drive manufacturing methodology according to the present invention, wherein an integrated test system replaces the discrete backend test of contemporary methodology.
Figure 13:
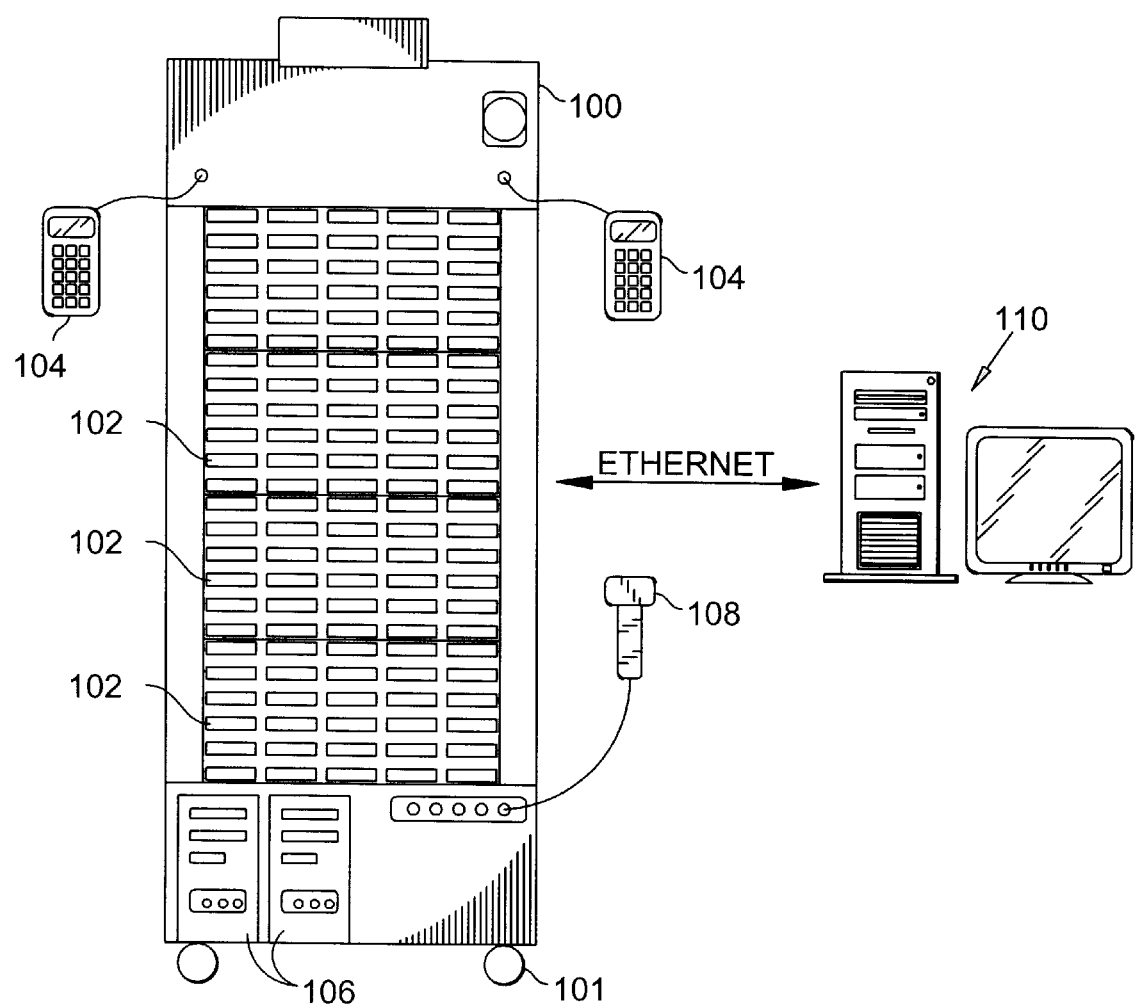
FIG. 13 is a front view of the integrated test system of the present invention.
Figure 14:
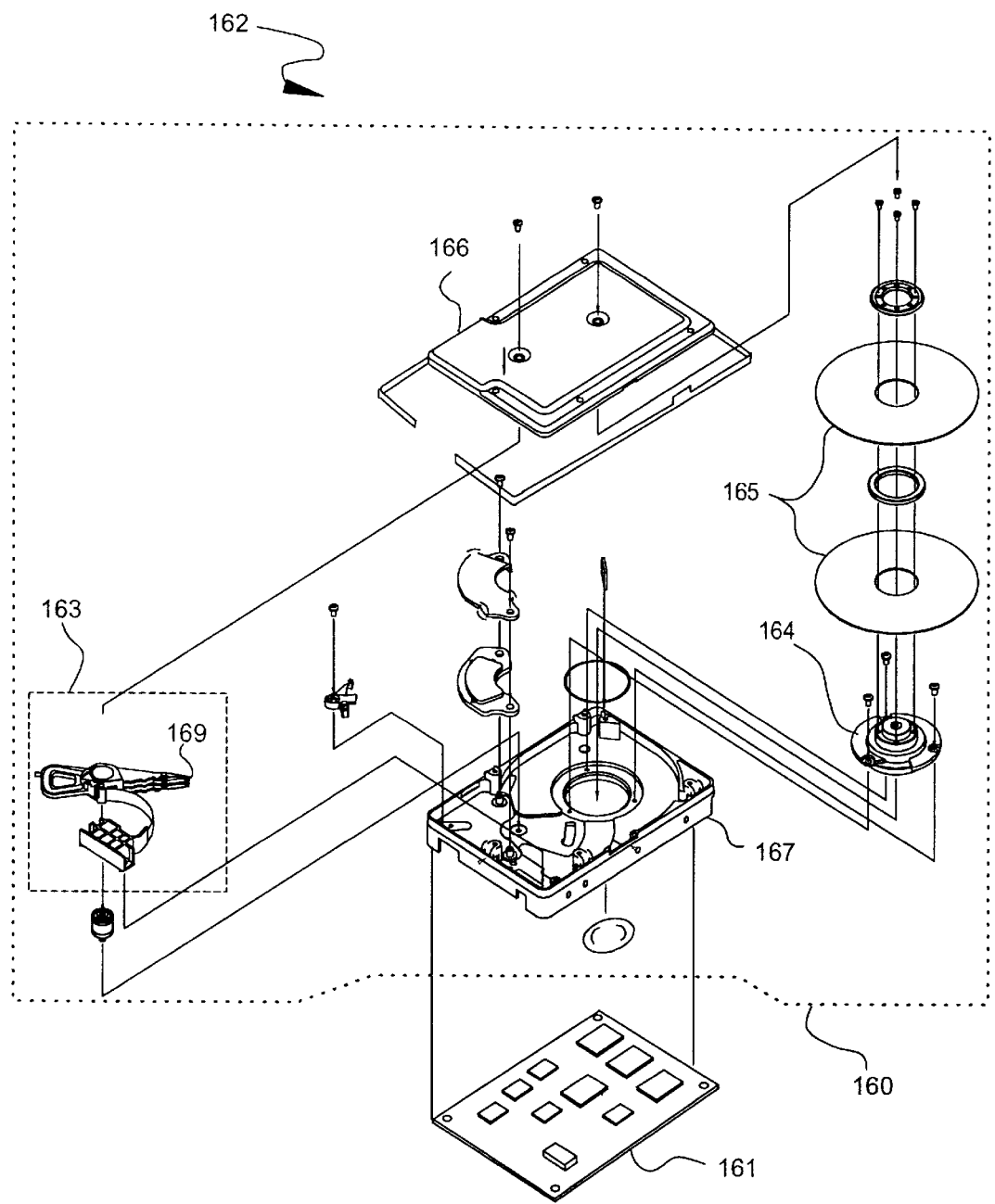
FIG. 14 is an exploded view of a disk drive 168 manufactured using the method of the invention.

Referring now to FIG. 2, according to the present invention, the separate stations utilized to perform the backend tests, i.e., tray load/initial drive test 24, IBI 26, and the final test 28, have been replaced by a single integrated test system 100 (shown in FIG. 13). Thus, according to the present invention, the separate IDT 24, IBI 26, and final test 28, of contemporary disk drive manufacturing methodology have been replaced with testing by an integrated test system which occupies substantially less floor space than the separate test stations utilized according to contemporary methodology, and which substantially reduces the handling required for the performance of such tests.

More particularly, according to the present invention, after the HDA 160 has been connected to the controller PCBA 161 22, then the resulting drive-under-test 162 is transported to an integrated test system and connected thereto 60. After connecting the drive-under-test 162 to the integrated test system, the integrated test system performs the backend tests 60 upon the drive-under-test 162.

As the integrated test system performs the backend test 62, the backend tests are monitored 64, preferably by a host computer 110 (as shown in FIG. 13).

Monitoring the backend tests 64 facilitates the modification 27a of earlier performed manufacturing processes when test results indicate that an earlier performed manufacturing process has been performed improperly. For example, when it is determined that a new step in a particular test procedure will result in more reliable disk drives, then that step may either be automatically or manually implemented. For example, it may be determined during the monitoring of backend tests 64 that a more rigorous or lengthy IBI is required. In this instance, the length of the IBI is increased accordingly.

Further, monitoring backend tests 64 facilitates the use of statistical process control utilizing statistical analysis 66 which further facilitates the modification 25 of such earlier performed manufacturing processes.

For example, if statistical analysis 66 determines that a particular one of a plurality of heads is found to have a defect substantially more frequently than the remaining heads, then a manufacturing process involving the affected head may be modified so as to mitigate the occurrence of such a defect.

It is important to note that statistical process control resulting from the monitoring of the backend tests 64 and statistical analysis 66, may be utilized to identify problems in any portion of the manufacturing process, including but not limited to the procurement of components from outside vendors, the assembly of such components, as well as the testing thereof.

After successful completion of the backend test 62, the disk drive is inspected 30 and the finished drive 34 is provided, ready for delivery to a customer.

Such integrated testing of the drive-under-test 162 is preferably performed outside of the clean room 10. However, as those skilled in the art will appreciate, such integrated testing may alternatively be performed within the clean room 10.

Figure 3:
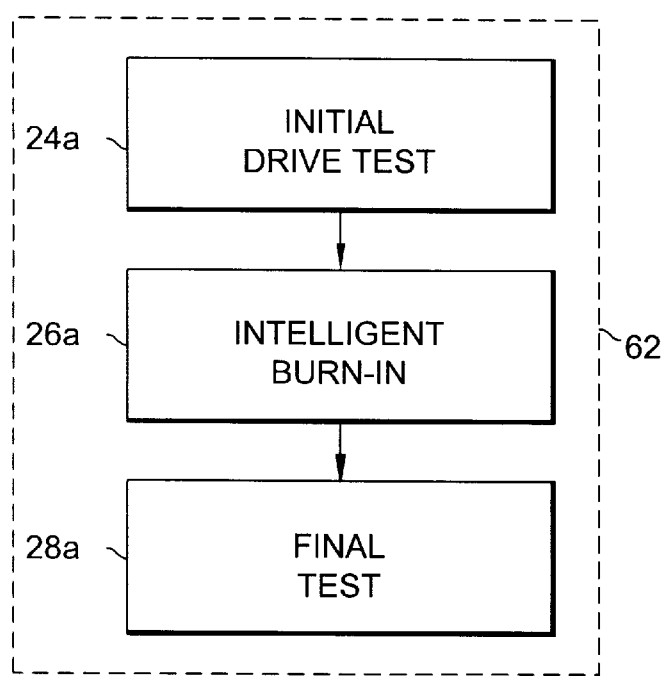
FIG. 3 is a flow chart showing the individual backend test performed by the integrated test system of the present invention.

Referring now to FIG. 3, the backend tests performed 62 by the integrated test system comprise an IDT 24a, IBI 26a, and a final test 28a. These tests are preferably performed generally in accordance with contemporary methodology. However, as those skilled in the art will appreciate, the use of an integrated test system according to the present invention facilitates the employment of various test efficiencies. For example, according to contemporary methodology, a portion of the IDT 24a is repeated during the IBI 26a. This repetition of a portion of the IDT 24a confirms that the drive was not damaged during its removal from the IDT station, its transport to the IBI station, and its connection and mounting to the IBI drive station. Since these steps are eliminated by the use of the integrated test system of the present invention, such repetition of a portion of the IDT may be eliminated, if desired.

Figure 4:
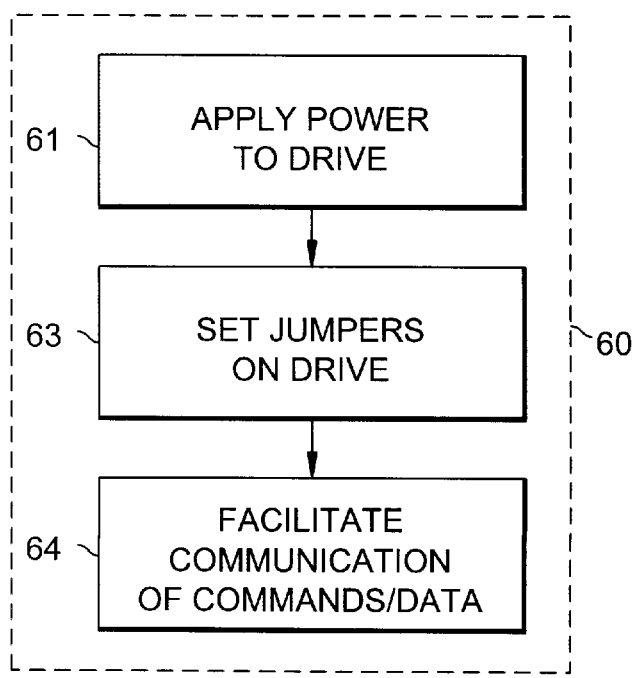
FIG. 4 is a flow chart depicting steps performed during connection of a drive-under-test 162 to the integrated test system of the present invention.

Referring now to FIG. 4, connection of the drive-under-test 162 to the integrated test system 60 comprises the application of power to the drive, which comprises the connection of a power source to the drive.

Connection of the drive-under-test 162 to the integrated test system 60 also comprises setting of jumpers on the drive-under-test 162. The jumpers on the drive-under-test 162 are preferably electrically configured by the integrated test system. Alternatively, the jumpers may be manually set by an operator.

Connection of the drive-under-test 162 to the integrated test system 60 further comprises the facilitating of the communication of commands and data 64 between the drive-under-test 162 and the integrated test system. This comprises the connection of a data cable from the integrated test system to the drive-under-test 162.

Figure 5:
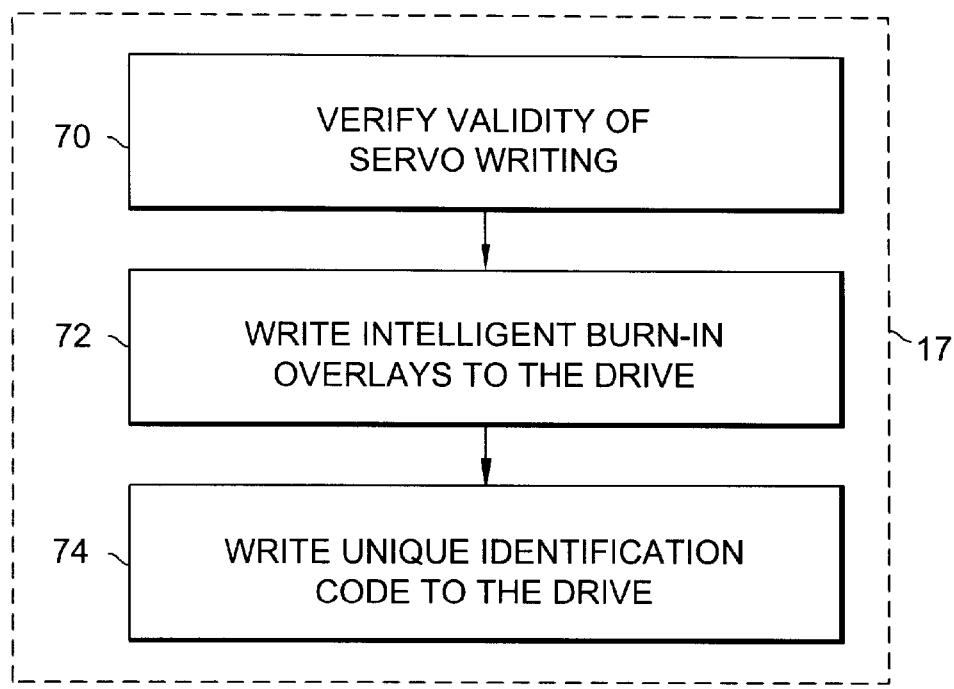
FIG. 5 is a flow chart depicting the steps performed during HDA 160 testing.

Referring now to FIG. 5, the HDA 160 test 17 preferably comprises verifying the validity of servo writing 70, writing IBI overlays to the drive 72, and writing a unique identification code to the drive 74.

Figure 6:
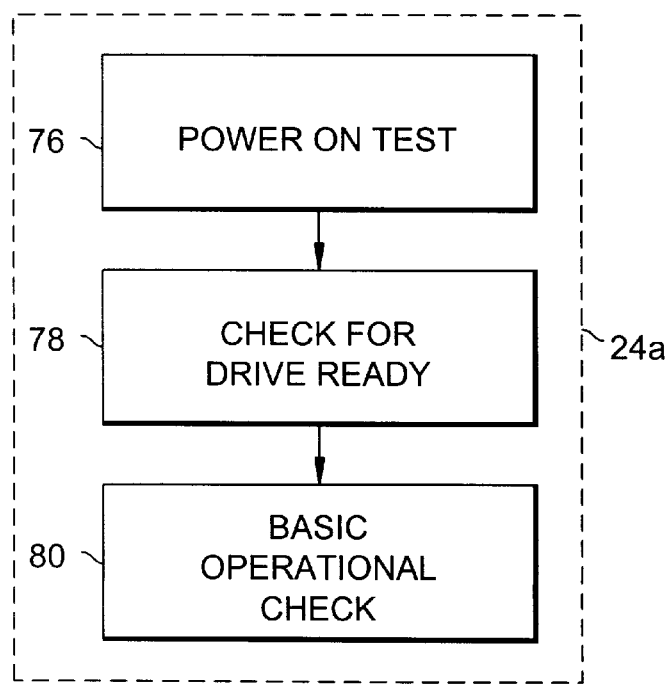
FIG. 6 is a flow chart depicting the steps performed during initial drive testing.

Referring now to FIG. 6, the IDT 24a preferably comprises a power-on test 76, a check for drive ready 78, and a basic operational check 80.

Figure 7:
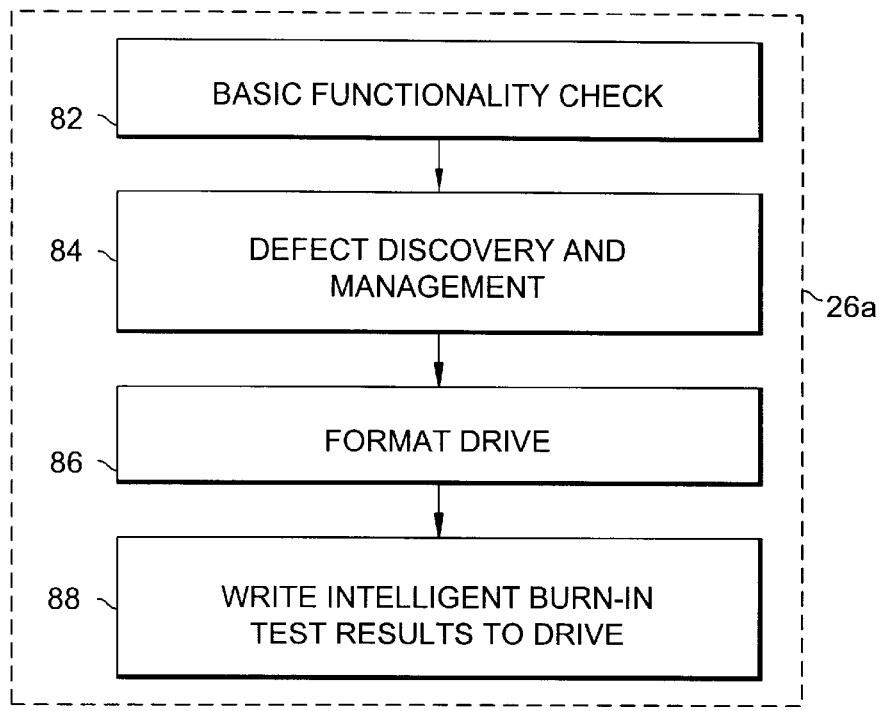

Referring now to FIG. 7, the IBI 26a preferably comprises a basic functionality check 82, defect discovery and management 84, formatting of the drive-under-test 162, and writing of the IBI test results to the drive 88.

Figure 8:
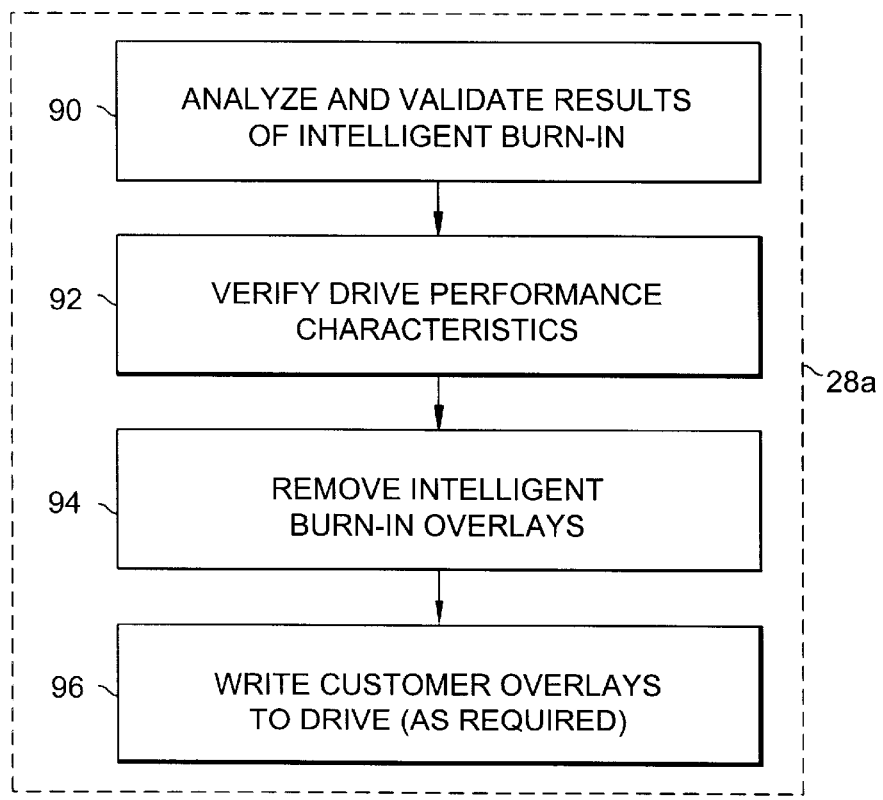
FIG. 8 is a flow chart depicting the steps performed during final testing.

Referring now to FIG. 8, the final test 28a preferably comprises analyzing and validating results of the IBI 90, verifying drive performance characteristics 92, removing IBI overlays 94, and writing customer overlays to the drive 96.

Referring now to FIGS. 9-12, operation of the integrated test system of the present invention is shown in further detail.

Figure 9A:
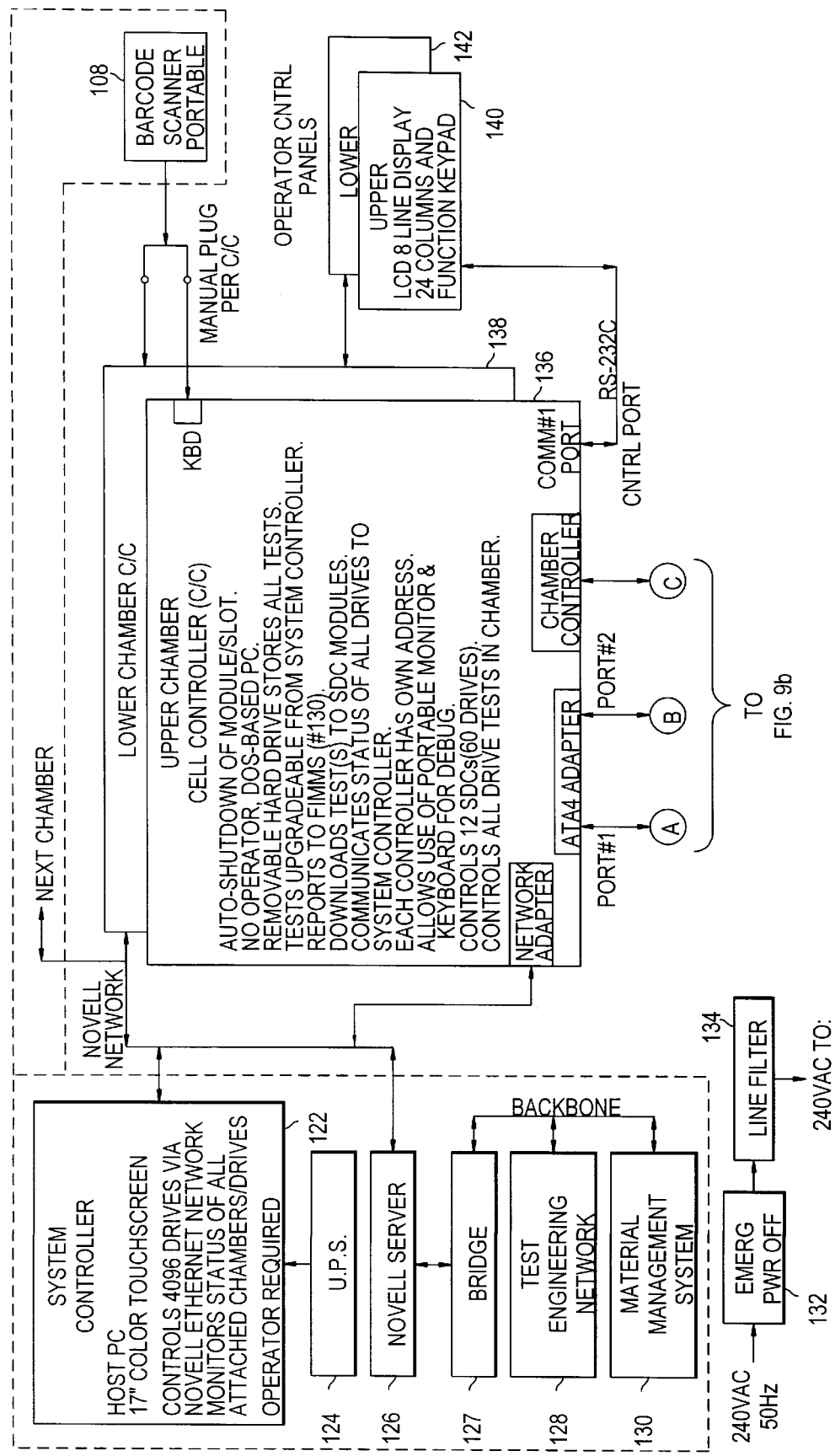
FIGS. 9a and 9b are block diagrams providing a general overview of the integrated test system architecture, according to the present invention.
Figure 9B:
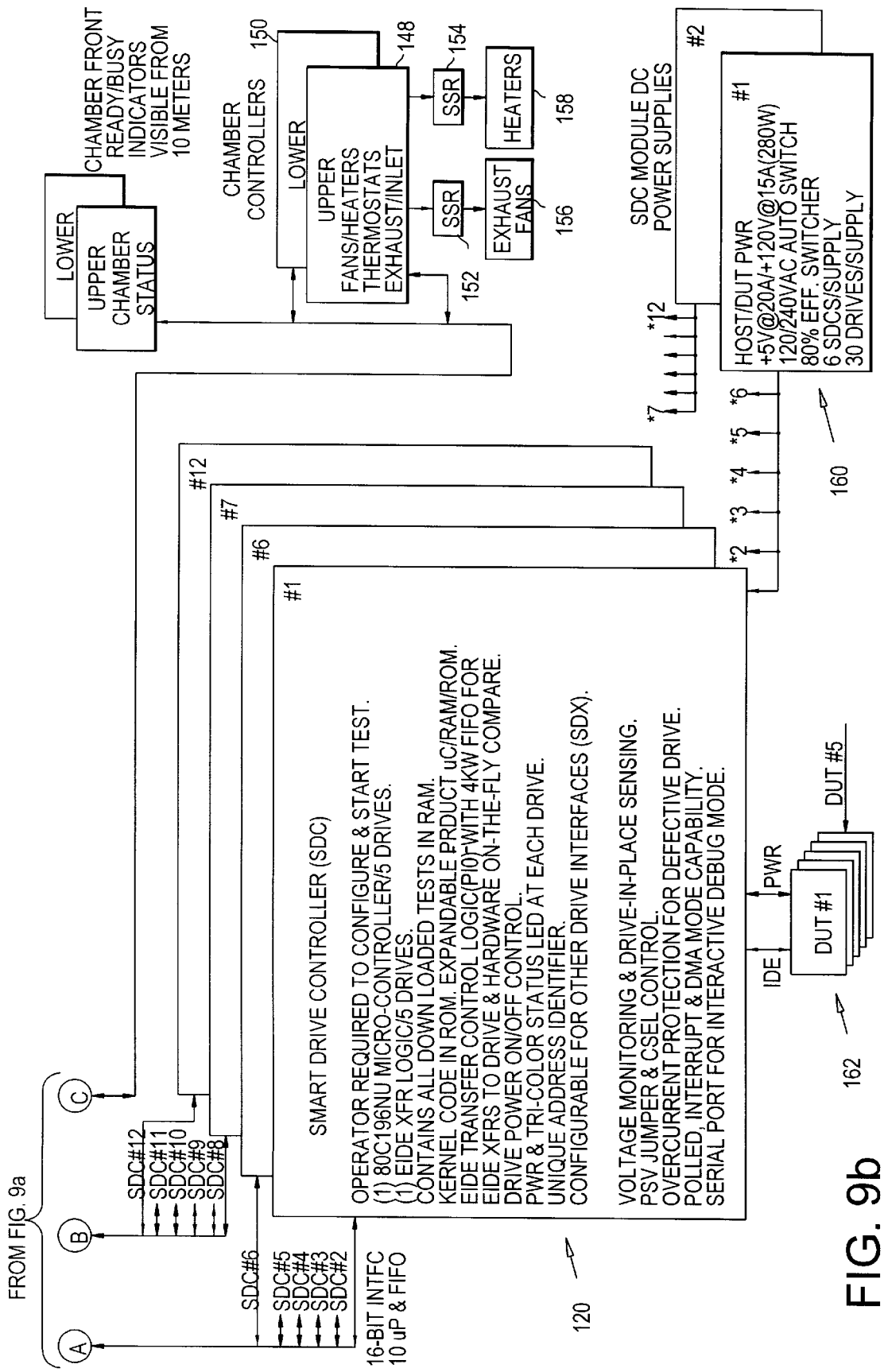

With particular reference to FIGS. 9a and 9b, the system architecture for the integrated test system of the present invention is shown. According to the preferred embodiment of the present invention, an upper chamber cell controller 136 and a lower chamber cell controller 138 each facilitates the control of 60 drives-under-test 162 via smart drive controllers 120. Thus, each of the upper chamber cell controller 136 and the lower chamber cell controller 138 interfaces to 12 smart drive controllers 120 and each smart drive controller 120 interfaces to 5 drives-under-test 162.

The system controller 122 interfaces to up to 4,096 drives-under-test 162 via a network and is preferably powered by uninterruptible power supply 124. NOVELL (a federally registered trademark of Novell, Inc. of Orem, Utah) server 126 interfaces a backbone via bridge 127. The backbone comprises test engineering network 128 and material management system 130.

Emergency power off control is provided via switch 132 and line filter 134.

Optional bar code scanner 108 facilitates the entry of bar codes from identification stickers applied to the disk drives.

Upper 140 and lower 142 LCD 8-line displays and function keypads facilitate the independent control and monitoring of those drives-under-test 162 disposed within the upper and lower bays of the rack (shown in FIG. 13), respectively. Upper 144 and lower 146 chamber status lights provide an indication of the status, i.e., ready or busy, on each of the upper and lower bays, respectively.

The upper 148 and lower 150 chamber controllers provide for the environmental control of the upper and lower chambers, respectively, via solid state relays 152,154 and exhaust fans 156 and heaters 158.

DC power supplies 160 provide power to the smart drive controllers 120.

The integrated test system of the present invention speeds up drive testing by using enhanced integrated drive electronics programmed input/output (PIO) and direct memory access (DMA) modes to transfer data to and from the drives-under-test 162. The PIO and DMA modes are implemented in conformance with the Enhanced Integrated Drive Electronics (EIDE) specification commonly employed in the personal computer industry. The present invention facilitates the testing of a plurality of drives concurrently with dedicated enhanced integrated drive electronics hardware. According to the preferred embodiment of the present invention, 120 disk drives are tested simultaneously. As those skilled in the art will appreciate, the integrated test system may be configured so as to test any desired number of disk drives simultaneously.

The enhanced integrated drive electronics logic can do concurrent writes to multiple drives-under-test 162 (broadcast mode) and single drive reads, with hardware on-the-fly data compares.

Figure 10:
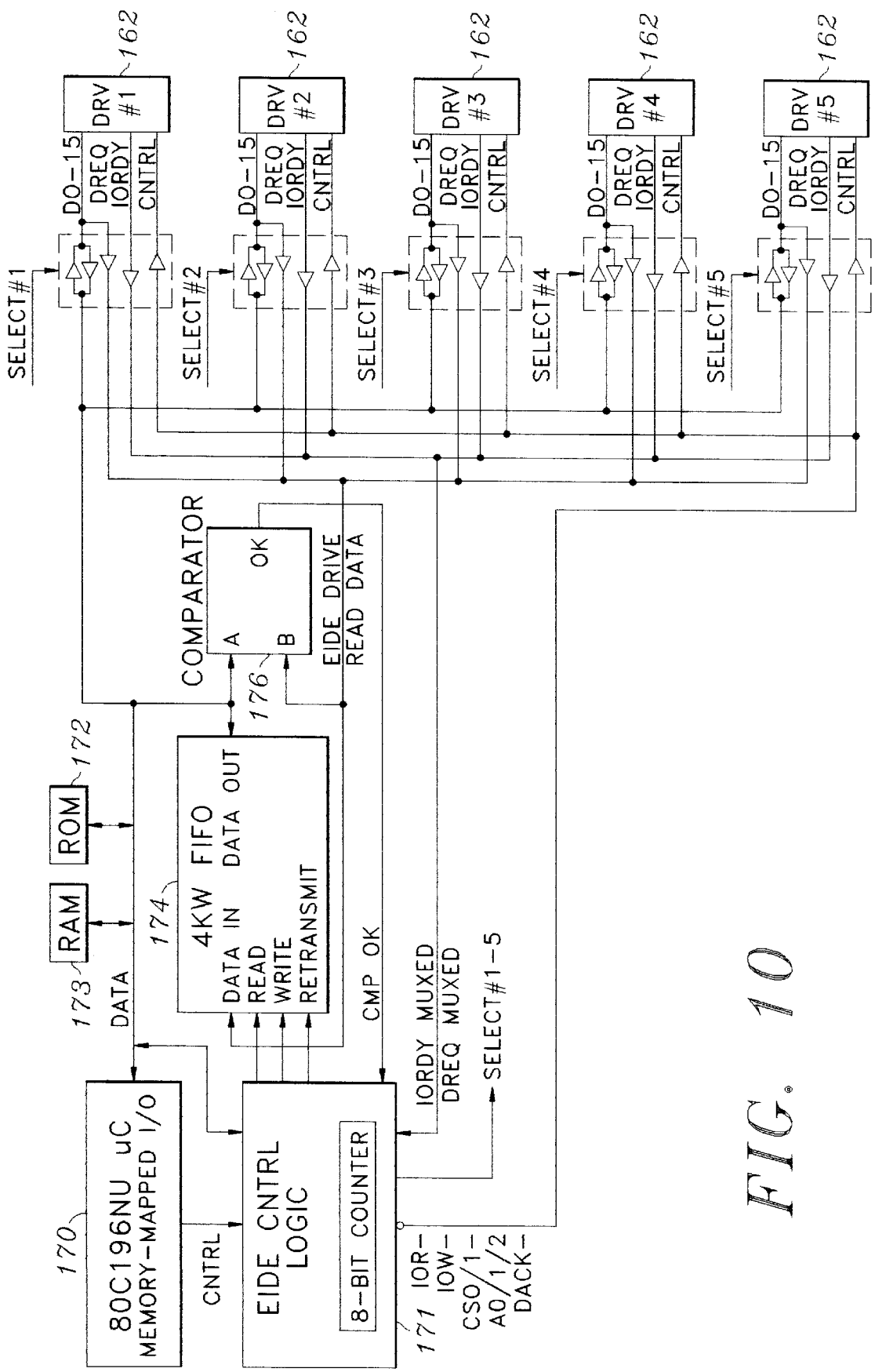
FIG. 10 is a general functional diagram of the integrated test system of the present invention.
Figure 11A:
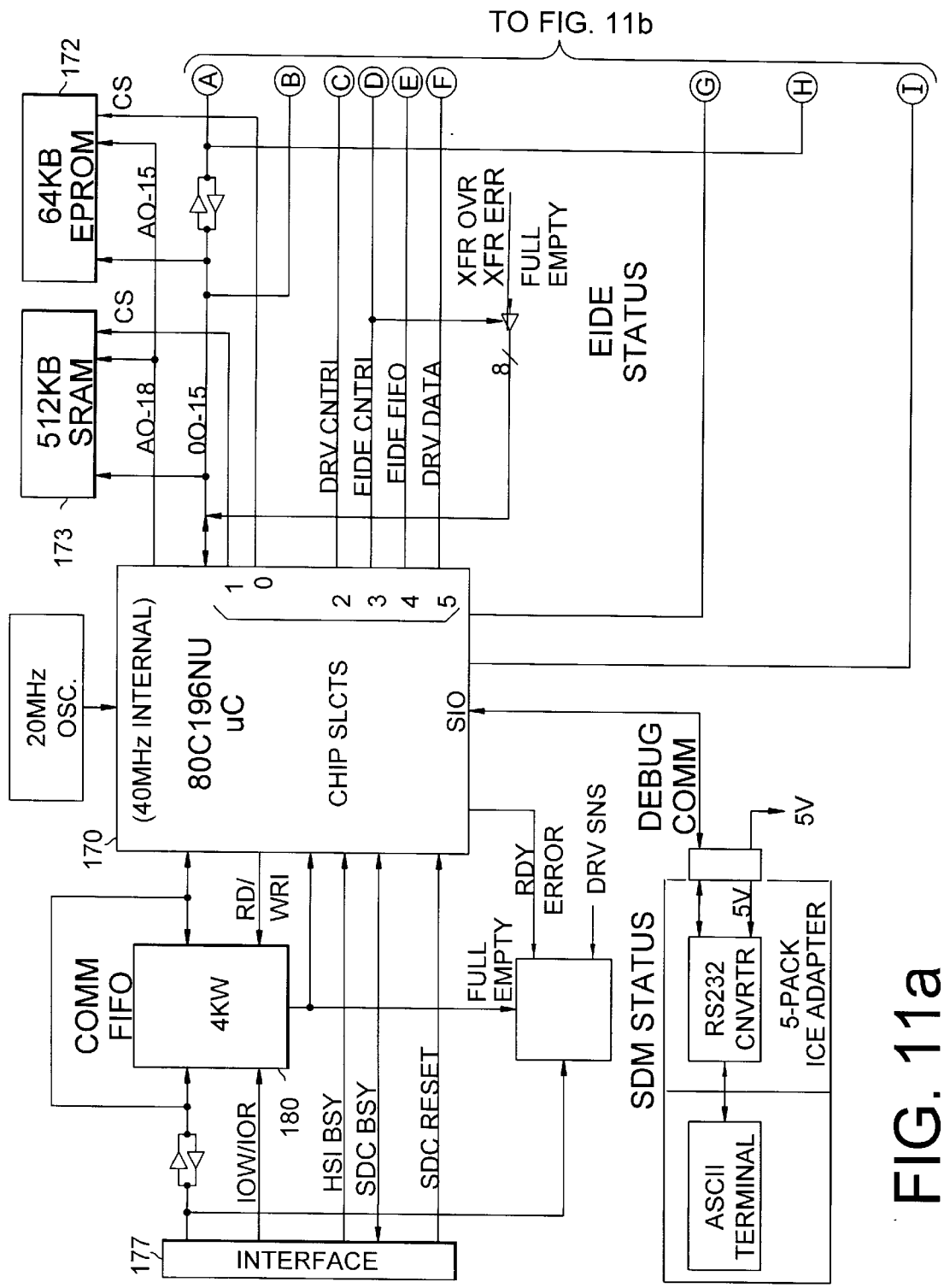
FIGS. 11a and 11b are functional diagrams of the integrated test system of FIG. 10, showing additional detail with respect thereto.
Figure 11B:
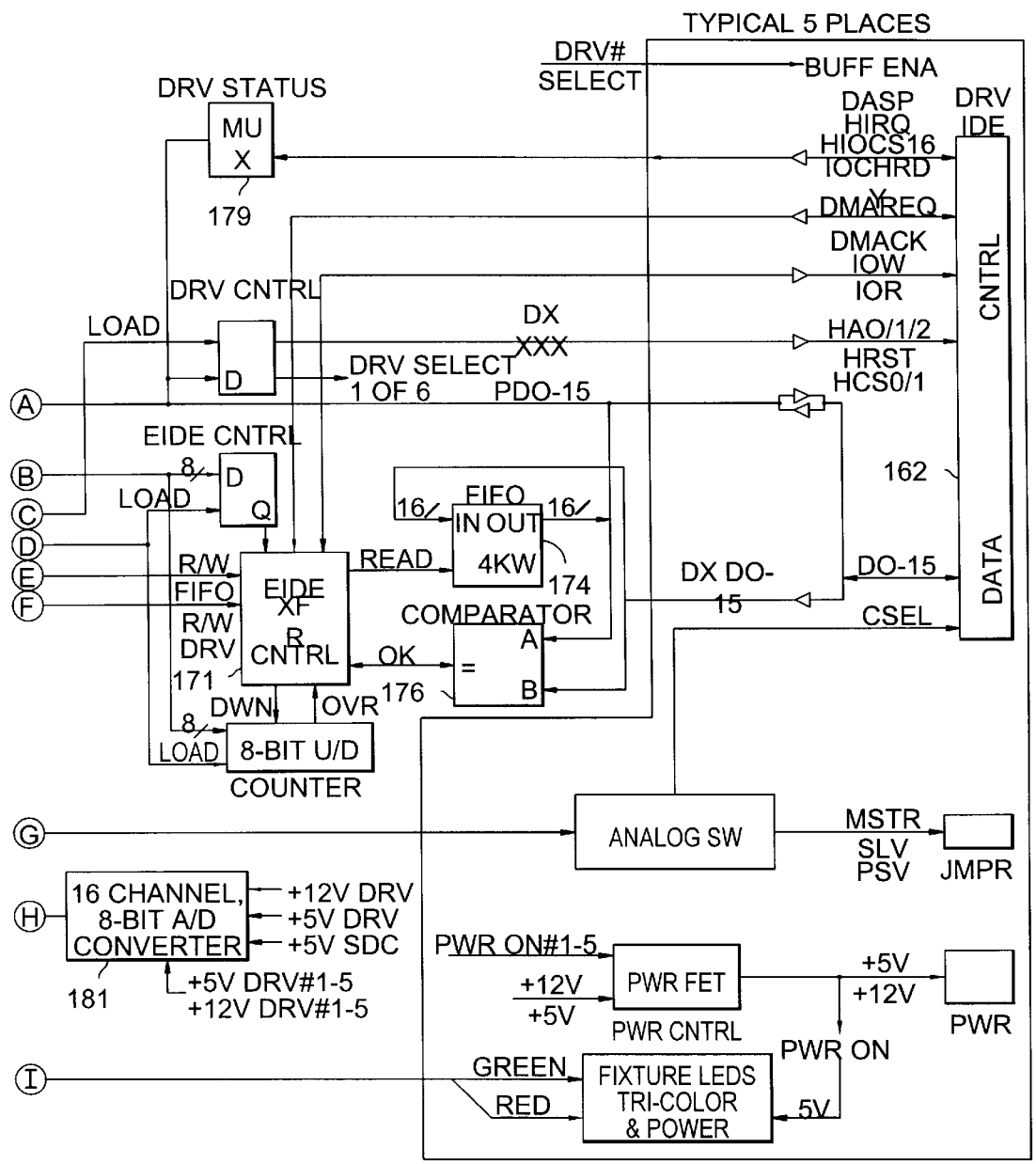

With particular reference to FIGS. 10,11a and 11b, an exemplary smart drive controller 120 is shown. An 80C196NU microcontroller 170 controls the operation of the smart drive controller 120, where the enhanced integrated drive electronics interface logic is contained. A ROM 172 kernel supports low-level operations, and high-level operations are uploaded to the microcontroller 170 from a host PC.

Each of the five drives 178 supported by a smart drive controller 120 has its own set of buffers which are individually selectable. A common set of data and control lines feed the inputs of these buffers. The enhanced integrated drive electronics throttling control lines from the drives-under-test 162 are multiplexed together as are the received data buffers.

The microcontroller 170 has full write/read control of the drives-under-test 162 except when it relinquishes that control to the enhanced integrated drive electronics logic.

A 4KW first-in, first-out (FIFO) buffer 174 is pre-loaded, by the microcontroller 170, with the data to be written to, or read from, the drive-under-test 162. For a drive read/compare operation, a comparator 176 is used to compare the data read from the single selected drive-under-test 162 with that of the data in the FIFO 174. For a write operation the FIFO 174 data is sent to all of the drives 178 which are selected at the time.

To control the amount of data words sent to, or received from the drives-under-test 162, the enhanced integrated drive electronics logic uses an 8-bit counter (1 data sector of 256 words or 512 bytes). This counter is pre-loaded by the microcontroller 170 before any enhanced integrated drive electronics operation, and is decremented by the enhanced integrated drive electronics logic with each enhanced integrated drive electronics word written or read from the drive 178. When this counter reaches zero, the enhanced integrated drive electronics operation ends and can then be re-armed by the microcontroller 170 if required.

The FIFO 174 has a re-transmit feature which resets the read pointer to allow regenerating the FIFO 174 data without microcontroller 170 reloading. As the FIFO 174 data is written to, or read from, the drives-under-test 162, the internal FIFO 174 read pointer is decremented. To regenerate the FIFO 174 data, the microcontroller 170, through the enhanced integrated drive electronics logic, generates a retransmit signal to the FIFO 174. Rearming of the enhanced integrated drive electronics logic only requires setting up the counter, setting the retransmit bit, and starting the enhanced integrated drive electronics operation over again.

Prior to starting an enhanced integrated drive electronics operation, the microcontroller 170 will set up the drive's task file registers, wait for the drive to set its data request bit (DRQ), and set the enhanced integrated drive electronics logic in motion. The microcontroller 170 can also do such tasks as a unique address test by writing, for instance, the logical block access in the first few words of the data sector, and adjust the enhanced integrated drive electronics counter accordingly, and allow the enhanced integrated drive electronics logic and FIFO 174 to transfer the remaining sector data. In a similar manner, the microcontroller 170 can append data words to end of the sector.

Another feature of the enhanced integrated drive electronics logic is the ability to capture the data read from the drive-under-test 162, during an on-the-fly read/compare operation. This allows the microcontroller 170 to determine where in the sector any errors occurred as well as the data that was in error. Re-reading that sector from the drive, by the microcontroller 170, may not be sufficient to cause the same data error to reoccur. The capture mode of enhanced integrated drive electronics read/compares will cause the data read from the drive-under-test 162, to be written back to the FIFO 174 at the same time that data is being compared with the FIFO 174 output. The FIFO 174 being asynchronous, allows this operation to occur. If an error occurs, the enhanced integrated drive electronics sets a flag to inform the microcontroller 170. Since the microcontroller 170 originally loaded the FIFO 174 data, the microcontroller 170 has that data to compare with. Should an error occur and the microcontroller 170 then reads the FIFO 174 data and compares it with the microcontroller's 170 RAM buffer to determine location and data. If no error occurs then a retransmit is not required since the data is written back as it is read out.

As mentioned above, each of the five drives 178 supported by the smart drive controller 120 has its own set of IDE buffers and power control. These buffers and power control are individually controllable from the microcontroller 170. According to the preferred embodiment of the present invention, each drive 178 has a power-on status LED and a tri-color LED (red/yellow/green) to indicate test status.

Enhanced integrated drive electronics data transfers, in DMA and PIO modes, are supported by enhanced integrated device electronics logic that is common to all five drives 178 supported by the smart drive controller 120. PIO mode 4 and DMA mode 3 are supported by this enhanced integrated device electronics logic 171. The microcontroller 170 is in control of this logic, and the microcontroller 170 can write and read to the drive in PIO mode 0 as well.

The option connector signals of master, slave and cable select are controlled in a group of five, and are controlled by the microcontroller 170 along with the IDE interface 177 signal of CSEL.

Up to six smart drive controller 120 cards can be connected together, on one IDE interface 177 port. This is accomplished by having the smart drive controller 120 inputs all tied in parallel. Each smart drive controller 120 has a unique address and can be selected individually from the host PC.

The smart drive controller 120 has the capability of supporting an in-circuit emulator (ICE). This is accomplished by adding two connectors which are not normally installed. By means of an adapter board, the smart drive controller 120 can connect to a ICE emulator. Also on the smart drive controller 120 is a serial I/O port connector for DEBUG mode use.

Four, 62128, 128K×8 SRAMs 173, are preferably used to maintain most of the smart drive controller's 120 firmware, and all of the buffers and data areas. One, 27C516, 64 K×16 ROM 172, is preferably used for firmware routines which are either required for power-up self-test diagnostics, loader for uploaded RAM code/data, and those common, and unlikely to change, routines which would occupy too much of the SRAM 173 area.

The microcontroller 170 is driven by a 20 MHz clock dedicated solely to the microcontroller 170. Internally the microcontroller 170 doubles the clock and runs at 40 MHz. This clock doubling is controlled by the connections of the PLLEN1 and PLLEN2 pins. The ONCE signal is used by the ICE, and in-circuit tester (ICT) to tri-state the microcontroller's 170 output pins. At power on, the microcontroller 170 is reset by the RC network at signal PRST-.

The microcontroller 170 is reset, by the host PC 110, via the HST_RST signal. This signal controls microcontroller 170 NMI (non-maskable interrupt) input. The firmware recognizes this input as a system reset and will reset the smart drive controller 120 logic by activating the URST- signal. In turn this signal generates a logic reset signal RESET-.

Non-multiplexed operation of the microcontroller's 170 address and data lines are configured within the firmware. Byte access to the SRAM 173 is available from the Microcontroller_WRH-(high byte) and Microcontroller_WRL-(low byte) signals; the ROM 172 has only 16-bit word access.

Peripheral logic is accessed using the memory-mapped I/O capability of the microcontroller 170. Each of the microcontroller's 170 six chip select outputs (CS0- to CS5-) are configured by the firmware for an address range that matches the smart drive controller 120 peripheral logic needs. When an access to a programmed I/O range for a peripheral occurs, that CSx- output is active, along with the Microcontroller_RD- or Microcontroller_WRx- signal. These signals are then used by the address decoder programmed logic device (PLD) to decode read and write signals for the peripheral logic.

The address programmable logic device also generates the PERI_ENA-signal to enable the peripheral buffers; all peripheral I/O is through these buffers. The TS1 signal (pulled down by a resistor) input to the programmable logic device is used by ICT (in-circuit tester) to tri-state all the programmable logic device's outputs for smart drive controller 120 test purposes.

The microcontroller 170 uses its various ports for I/O with the host PC 110, via the communication control and status register. The debug mode serial I/O, and the drive status LED for each drive-under-test 162 are controlled directly from a microcontroller 170 port.

Each smart drive controller 120 can be configured for one of six addresses by means of a jumper, or jumpers, on the ADRO-2 signal lines. The printed circuit board assembly preferably has holes for mounting a jumper header for test purposes, but these lines are normally controlled by inputs from the power connector.

The host PC 110 (FIG. 13) communicates with a particular smart drive controller 120 by writing to a control register using the CS1-signal of the IDE interface 177. Contained in this control register byte is a smart drive controller 120 address (from 1–6) and a select bit. Once the smart drive controller's 120 SELECT bit is set, reading the 16-bit status register, using CS1-signal, will cause the selected smart drive controller's 120 status register to be output to the IDE interface 177. The status register returns the address lines, inverted from the input, as well as the state of the COMM FIFO's 180 full and empty signals, drive-under-test 162 in place sense, and various microcontroller 170 communication handshake signals.

The COMM FIFO 180 can be read and written, both from the microcontroller 170 and the host PC 110. The microcontroller 170 accomplishes this with memory-mapped I/O via the CS_FIFO- chip select signal; the host PC 110 does the same through the use of the CSO- signal address range of the IDE interface 177.

The COMM programmable logic device contains the COMM control register, COMM FIFO 180 write/read control logic, the decoding for the COMM status register enable (RD_SS-), and the required HST_IOC S16-signal returned to the IDE interface 177 for 16-bit transfers. A TS2 input to the programmable logic device tri-states all outputs for test purposes. The programmable logic device outputs labeled with a signal name, but unconnected to anything, are signals that are internal to the programmable logic device logic but brought out for test purposes. The HST_BSY, HST_CMD, HST RST, and HST_PERR programmable logic device output signals are communication handshake/error signals to the microcontroller 170. They also manage the protocol necessary to ensure proper use of the shared COMM FIFO 180. The COMM FIFO 180 is used to pass commands, data and status between the host PC 110 and the microcontroller 170.

The COMM FIFO's 180 input and output are tied together so that both the host PC 110 and the microcontroller 170 can access it using a set of buffers for each. These buffers are managed by the COMM programmable logic device. The COMM FIFO's 180 low byte outputs the full (CF_FULL-) and empty (CF_EMPTY-) signals which are used by the host PC 110 and the microcontroller 170 for status. The microcontroller 170 has direct control of the COMM FIFO's 180 reset signal (CF_RST-).

All data communication with the host PC 110 is over the 16-bit data interface to the IDE interface 177 (HST_DO-15).

The only host control to the smart drive controller 120 that does not require addressing the smart drive controller 120 is the global reset signal line that comes from the HRST-signal on the input from the IDE interface 177. This signal, on the IDE interface 177, is the hard reset line. If this signal is activated it will reset all the connected smart drive controller's 120 microcontrollers, via each smart drive controller's 120 COMM programmable logic device. An RC filter is used to protect against any spurious noise that might be present. The reset from the microcontroller 170 to the COMM programmable logic device (RESET-) will not cause any action on the reset generated by the global reset line, although the RESET- will cause the other programmable logic device bits to be reset.

The enhanced integrated device electronics logic consists of an enhanced integrated device electronics FIFO 174 (identical to the COMM FIFO 180), an 8-bit presettable counter, a control programmable logic device containing a control register, and a status register. All of these elements are controlled directly by the microcontroller 170.

All data sent to the drives-under-test 162 comes from the enhanced integrated device electronics FIFO 174. As well, all data read from a single drive-under-test 162 is compared against the data in the COMM FIFO 180. For both read and write operations the enhanced integrated device electronics logic sends up to one sector 512 bytes or 256 words, at a time to the drives-under-test 162; after a sector is transferred, the microcontroller 170 may re-arm the enhanced integrated device electronics logic to send/receive another sector of data.

This enhanced integrated device electronics logic is shared among all five drives-under-test 162 and can operate to write to all five drives-under-test 162 concurrently (broadcast mode), although only one drive at a time can be read from. For enhanced integrated device electronics read operations this logic will do hardware compare-on-the-fly operations to facilitate a read/compare operation, which is normally done, in two steps of read and then compare.

Control of the enhanced integrated device electronics operation is done via bits in the enhanced integrated device electronics control register. A XFR_REQ bit will start an enhanced integrated device electronics operation. The XFR_DIR and XFR_TYP bits controls the operations of read, write, and transfer type (PIO or DMA) as well as the type of the read operation (CAPTURE or non-capture). Other bits allow resetting and retransmitting the enhanced integrated device electronics FIFO 174 and all selected drives-under-test 162 (DX_RST-) via the IDE hard reset signal HRST-.

The enhanced integrated device electronics operation, once started, will read a data word from the enhanced integrated device electronics FIFO 174 for either a drive-under-test 162 read or write. For a drive-under-test 162 write that FIFO 174 data will be sent to the drives-under-test 162 selected, along with an IOW- signal. For a drive-under-test 162 read, the received data (due to the IOR- signal) will be compared with the FIFO 174 data. All the drive addresses and control signals are generated from the enhanced integrated device electronics programmable logic device. After the FIFO 174 read, and drive-under-test 162 read or write, the 8-bit counter is decremented and the operation repeats until the counter reaches zero.

The enhanced integrated device electronics programmable logic device (FIGS. 12*a* and 12*b*) will throttle back the drive-under-test 162 reads or writes if IOCHRDY is de-asserted by any drive-under-test 162 in PIO mode. In DMA mode, the programmable logic device will generate DACK- in response to a drive-under-test's 162 DREQ signal. If a compare error occurs during a read operation, the XFR_ERR bit from the programmable logic device will be set but the operation will continue until the counter reaches zero. At that time the XFR_OVR bit is set. When the microcontroller 170 reads this bit, the XFR_REQ bit will be cleared; this will clear the XFR_OVR and XFR_ERR (if set) bit(s).

Before an enhanced integrated device electronics operation, the enhanced integrated device electronics FIFO 174 is pre-loaded, by the microcontroller 170, with the data to be written to, or read from, the drives-under-test 162. To control the amount of data words sent to, or received from the drives-under-test 162, the enhanced integrated device electronics logic uses an 8-bit counter (1 data sector of 512 bytes). This counter is pre-loaded by the microcontroller 170 before any enhanced integrated device electronics operation.

The FIFO 174 has a re-transmit feature which resets the read pointer to allow regenerating the FIFO 174 data without microcontroller 170 reloading. As the FIFO 174 data is written to, or read from, the drives-under-test 162, the internal FIFO 174 read pointer is decremented. To regenerate the FIFO 174 data, the microcontroller 170, through the enhanced integrated device electronics logic, generates a retransmit signal to the FIFO 174. Rearming of the enhanced integrated device electronics logic only requires setting up the counter, setting the retransmit bit, and starting the enhanced integrated device electronics operation over again.

Prior to starting an enhanced integrated device electronics operation, the microcontroller 170 will set up the drive's task file registers, wait for the drive to set its data request bit (DRQ), and set the enhanced integrated device electronics logic in motion. The microcontroller 170 can also do such tasks as a unique address test by writing, for instance, the logical block access in the first few words of the data sector, and adjust the enhanced integrated device electronics counter accordingly, and allow the enhanced integrated device electronics logic and FIFO 174 to transfer the remaining sector data. In a similar manner, the microcontroller 170 can append data words to end of the sector.

As mentioned above, the enhanced integrated device electronics logic has the ability to capture the data read from the drive-under-test 162, during an on-the-fly read/compare operation. This allows the microcontroller 170 to determine where in the sector any errors occurred as well as the data that was in error. Re-reading that sector from the drive, by the microcontroller 170, may not be sufficient to cause the same data error to reoccur. The capture mode of enhanced integrated device electronics read/compares will cause the data read from the drive-under-test 162, to be written back to the FIFO 174 at the same time that data is being compared with the FIFO 174 output. The FIFO 174 being asynchronous, allows this operation to occur. IF an error occurs, the enhanced integrated device electronics logic sets a flag to inform the microcontroller 170. Since the microcontroller 170 originally loaded the FIFO 174 data, the microcontroller 170 has that data to compare with. Should an error occur and the microcontroller 170 then reads the FIFO 174 data and compares it with the microcontroller's 170 RAM buffer to determine location and data. If no error occurs then a retransmit is not required since the data is written back as it is read out.

The enhanced integrated device electronics logic reads and writes in a 150nS cycle. This is a sustained, burst rate of 13.3 MB/second. Mode 3 DMA allows for a maximum 16.6 MB/S but the enhanced integrated device electronics logic can sustain its 13.3 MB/S rate and this causes the drive-under-test 162 to throttle back to run at the RAN channel rate plus the command overhead time. This is faster than any PC can sustain a transfer to a drive-under-test 162 at. The 20 MHz oscillator that drives the COMM and enhanced integrated device electronics programmable logic devices can be bumped up to a 25 MHz version to generate 16.6 MB/S data rates.

The IDE MUX programmable logic device 179 generates the drive-under-test 162 buffer enable signals and "ors" the drive-under-test 162 IDE-driven signals of DREQ, and IOCHRDY; these signals are used by the enhanced integrated device electronics control programmable logic device.

Each drive-under-test 162 has a transceiver which connects a drive-under-test's 162 IDE data bus signals to the smart drive controller's 120 peripheral bus. This allows the microcontroller 170 to read and write to the drive-under-test 162 as sell as providing a write path from the enhanced integrated device electronics FIFO 174 to the drive-under-test 162. More subtle is that this transceiver also provides a path for the microcontroller 170 to write data to the enhanced integrated device electronics FIFO 174; to do this one of the drives-under-test 162 must be selected, but an IOW- signal will not be generated to the drive-under-test 162 when writing to the enhanced integrated device electronics FIFO 174. These transceivers are enabled when a drive-under-test 162 is selected, but will be disabled even when a drive-under-test 162 is selected, during the enhanced integrated device electronics read operation. The MUX programmable logic device 179 controls these buffer enable signals.

Each drive-under-test 162 also has a buffer that allows routing the drive-under-test 162 data bus to a common data bus that connects to the enhanced integrated device electronics FIFO 174 input and one input of the enhanced integrated device electronics comparator 176. This is also part of the path for the microcontroller 170 to write to the enhanced integrated device electronics FIFO 174. These buffers will be enabled only when both the drive-under-test 162 is selected, and an enhanced integrated device electronics read operation (DF_ENA- signal active) is in progress.

A buffer also exists for each drive-under-test's 162 control signals. All of these control signals for the IDE interface 177 of the drives-under-test 162 emanate from the enhanced integrated device electronics programmable logic device except for HRST- signal which is sourced at the enhanced integrated device electronics control register. These buffers are enabled whenever a drive-under-test 162 is selected (DX_SEL-).

Figure 12A:
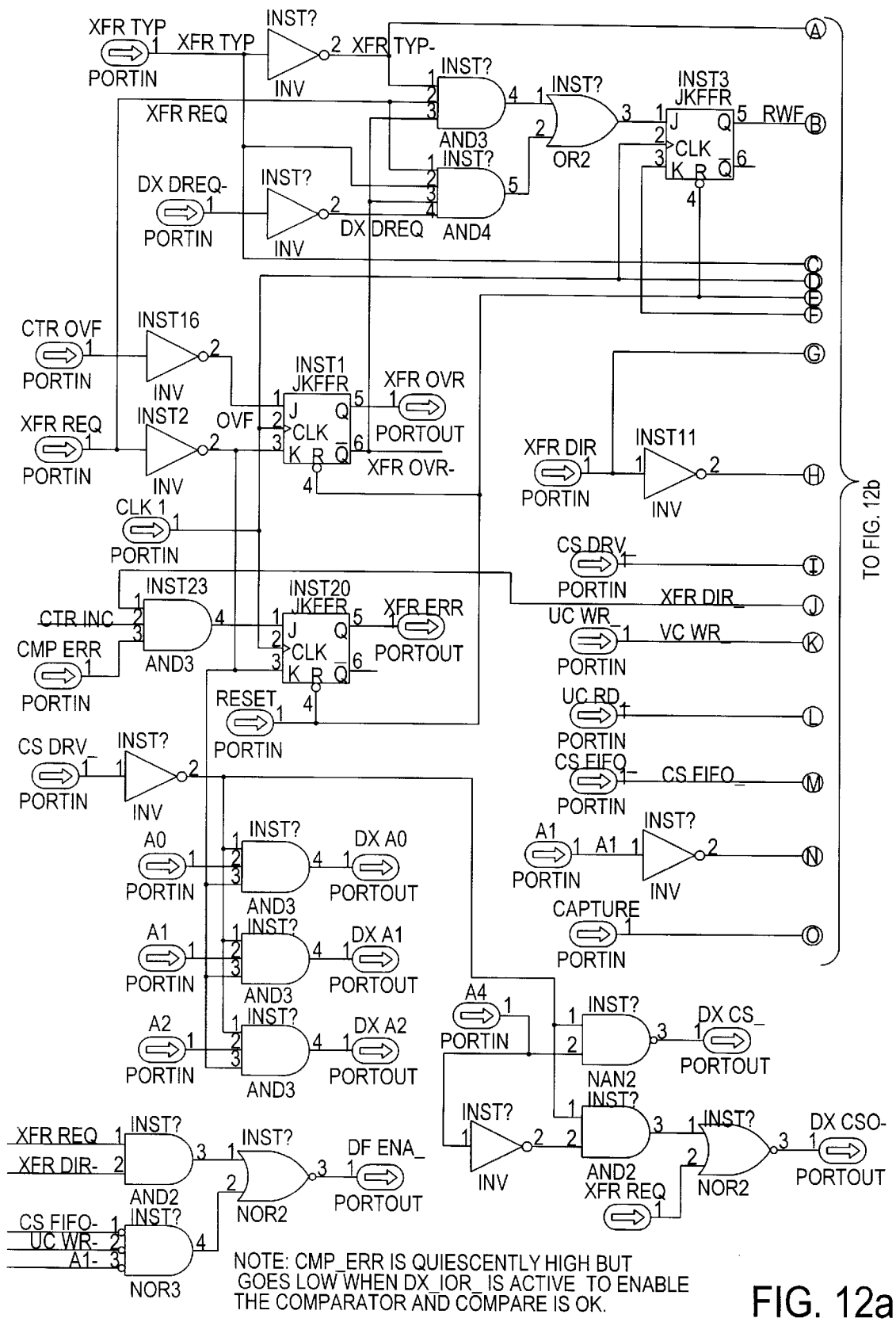
FIGS. 12a and 12b are schematics showing the enhanced integrated drive electronics transfer control program logic device of FIG. 11.
Figure 12B:
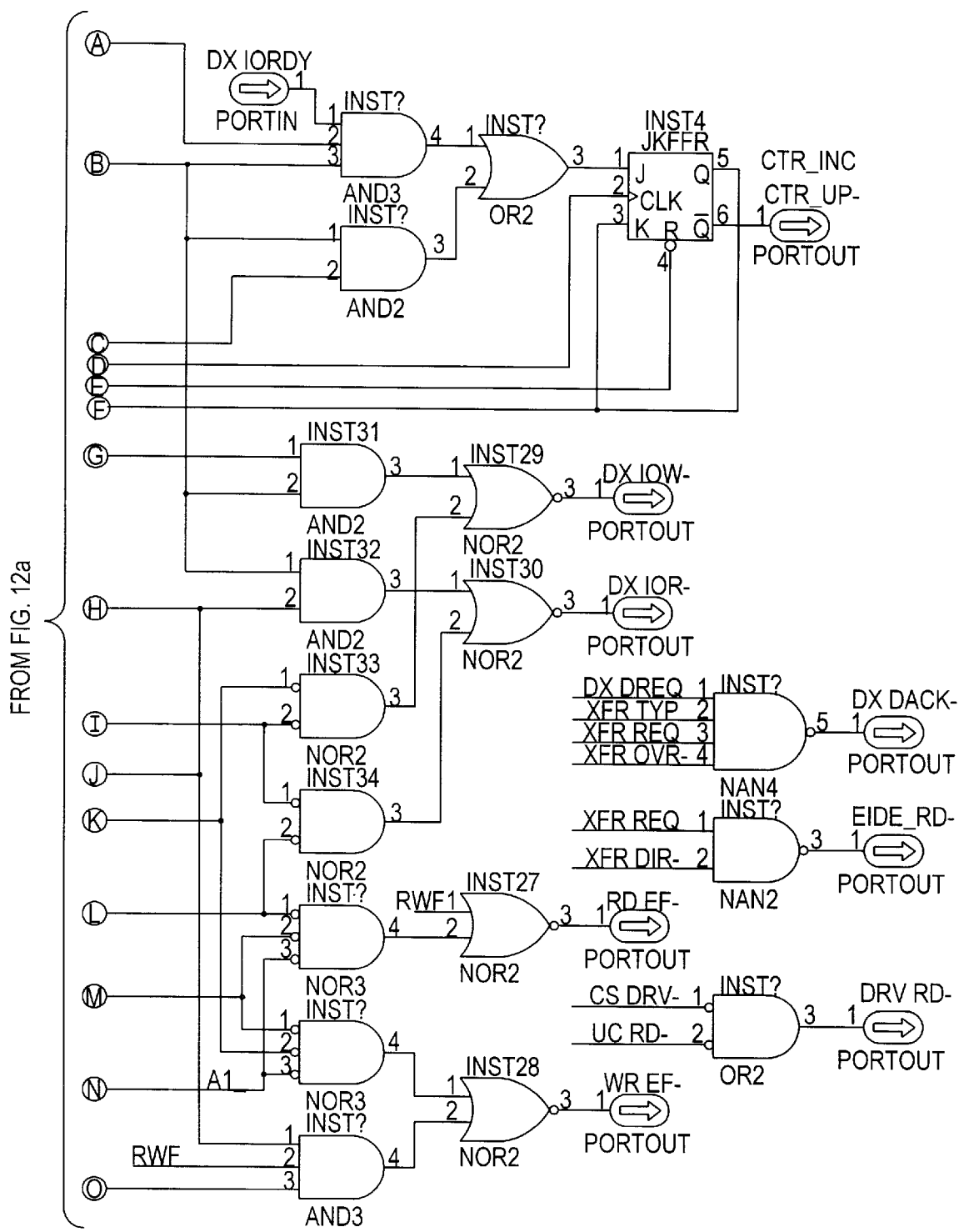

The MUX programmable logic device 179 "ors" all the selected drive-under-test 162 DREQ signals into one signal called DX_DREQ which is routed to enhanced integrated device electronics programmable logic device of FIGS. 12*a* and 12*b*. In like manner, the drive-under-test 162 IOCHRDY signals become DX_IORDY to the enhanced integrated device electronics programmable logic device. A pull-down resistor input to this programmable logic device will tri-state all the output signals for test purposes.

The drive CSRs are all accessed through a common microcontroller 170 chip select, albeit each register has its own address in that chip select range. The enables and write clocks for these registers originate at the ADDR programmable logic device.

Drive control register #0 has the individual drive-under-test 162 power-on bits as well as the common bits to control the common drive-under-test 162 option jumpers. Control register #1 has the individual drive-under-test 162 select bits and the common cable select (CBL_SEL) signal that is on the IDE interface 177 for selecting a drive on a common IDE bus. Both of these control registers are 8-bits.

The three status registers, #0, #1, and #2, are all 16-bits. The low bytes of #0 and #1 are the bits of the above control registers. The high bytes contain the DASP- IDE signal which reflects the drive-under-test's 162 activity LED and the drive-in-place sense (DX_SNS-). This drive sense signal comes from pin 40 of the IDE interface 177; this pin is grounded at the drive-under-test 162, but is sacrificed for use as a sense signal and not connected to ground at the smart drive controller 120. The third status register contains IDE signals of IOCS16-and HIRQ (interrupt).

The +5V power switch is an IC designed to control the rise time of the +5V output. This part was designed for use in PCMCIA cards that switch power. It is thermal and overload protected internally and rated for 1.2 Amps. The precision resistor network connected to the output switched power produces a 1.25V output, when the switched power is a nominal +5.00V. This 1.25V (Nom.) is fed to an ADC 181 so that the microcontroller 170 can read the absolute value of the switched power to the drive.

The +12V power switch consists of a FET driver driving a parallel-connected pair of 20V, 2.0Amp. FETs. The output of the power FET is connected to a PTC (positive temperature coefficient) device which will limit the output current by acting as a resettable circuit breaker. A PTC will increase its resistance when a current overload occurs. When the overload is removed, the PTC will cool off and drop its resistance to near zero. A precision resistor network drops the nominal +12.00V output to 1.25V for the ADC 181.

The tri-color LED drivers are driven by the microcontroller 170 and these drivers, in turn, control the RED and GREEN portions of the tri-color LED associated with each drive-under-test 162, at the fixture. The tri-color LED has a common cathode which is connected to ground; that requires a resistor in the anode of the LEDs.

The ICE connectors are used when an ICE is connected to the smart drive controller 120 for debug purposes. All the signals from the microcontroller 170 are on this connector. An adapter board (5-pack ICE adapter) connects to this board and the ICE emulator, in turn, connects to the 5-pack ICE adapter.

The option jumpers and the cable select signal on the IDE interface 177, for all the drives-under-test 162, are controlled in a single block by using tri-stated buffers to control pulling these signals to ground. On the drive-under-test 162 these signals have pull-up resistors so only a connection to ground is required. The microcontroller 170 directly controls these buffers which act as switches.

All the series terminating resistors for the drive-under-test 162 data lines are shown here. These resistors are intended to match the impedance of the buffers with the impedance of the signal lines in order to reduce line reflections.

The ADC 181 shown here is a pair of 8-bit, 8 channel A/D converters with a +/−1 LSB accuracy. It is directly controlled by the microcontroller 170. All the drive-under-test 162 switched power plus the smart drive controller 120 input power for the drives and the smart drive controller 120 logic are input to this ADC 181. The reference voltage is a 2.5V +/−0.2% zener. This sets the reference for the ADC 181. All the inputs to be measured are reduced to 1.25V when the corresponding voltage is at its nominal setting.

To read the ADC 181, the microcontroller 170 writes a command to the ADC 181 and waits for the ADCX_RDY-signal is active indicating that the conversation is complete.

The enhanced integrated device electronics logic can write 16-bit data to a selected drive. If multiple drives are selected then the enhanced integrated device electronics data is written to all selected drives (broadcast mode). Enhanced integrated device electronics data that is written to the selected drive(s) comes from the enhanced integrated device electronics FIFO 174. This FIFO 174 must be loaded by the microcontroller 170 prior to starting any enhanced integrated device electronics operation. If the enhanced integrated device electronics data is to be written to multiple sectors, then the microcontroller 170 only needs to load the FIFO 174 once. This is because the microcontroller 170 has control of the "retransmit" function of the FIFO 174; this feature allows the read/write pointers of the FIFO 174 to be reset, so that the FIFO 174 data can be accessed from the beginning again.

The enhanced integrated device electronics logic can read 16-bit data from a single selected drive and will compare the data read from the selected drive with the data stored in the FIFO 174. If a compare error occurs, the enhanced integrated device electronics read operation will continue until completed, and an error bit will be set. During the read/compare operation, the data read from the drive can optionally, be stored, on-the-fly, in the FIFO 174 as well.

The transfer count for the number of enhanced integrated device electronics words to transfer (read or write) is set in an 8-bit counter. This counter counts up and the enhanced integrated device electronics transfer is complete when this counter overflows to zero. When this occurs a transfer complete bit is set to indicate such. To read or write multiple sectors, the microcontroller 170 needs only to rearm the enhanced integrated device electronics counter and transfer logic for another sector. Because the counter counts up, the value loaded in the counter must be the 2's complement of the number of words to transfer. This overhead will not affect enhanced integrated device electronics operations to the drive in any way because the drive cannot sustain, over multiple sectors, the transfer rate that the enhanced integrated device electronics logic can send or receive. In a sustained enhanced integrated device electronics data transfer the overall data rate will be limited by the read/write channel data rate and not the smart drive controller 120.

Enhanced integrated device electronics transfers can occur in both PIO mode and DMA mode. During PIO operation the drive will throttle back the smart drive controller 120 (host to the drive) by de-asserting the IOCHRDY signal. During DMA operation the drive will throttle back the smart drive controller 120 by de-asserting the DMAREQ signal. In either enhanced integrated device electronics mode, the microcontroller 170 must have previously set up the conditions for the drive to operate in the specified mode. Since the microcontroller 170 can fully read and write the task file registers of the drive, it has full capability to execute this operation. Also prior to, or concurrent with, starting the enhanced integrated device electronics control logic operation, the microcontroller 170 must also set up the bit(s) that control the options of the enhanced integrated device electronics logic such as data transfer type, direction (read or write) and if an enhanced integrated device electronics read, if the drive data is to be captured in the FIFO 174.

Starting the enhanced integrated device electronics logic in operation involves only setting the transfer request bit and waiting for the transfer complete bit to be set. When the complete bit is set, the microcontroller 170 should reset the request bit; this will then reset the complete bit; at this time the transfer error bit, if set, will also be cleared. If the transfer counter is set to zero, the transfer will be for 256 words or 512 bytes. If the FIFO 174 re-transmit bit is not asserted, then the data will be accessed sequentially out of the FIFO 174, presuming there is more data in the FIFO 174. Accessing an empty FIFO 174 will result in no physical access, and result in all 1's (hex FF).

Prior to any enhanced integrated device electronics operation, the user must load the FIFO 174 with data to be sent to, or received from, the drive. If required the FIFO 174 can be reset (all data in FIFO 174 is lost) setting, then clearing b4 of the enhanced integrated device electronics control reg (data is maintained but pointers are reset to beginning of FIFO 174). The FIFO 174 can be checked for empty by checking status of b3 of enhanced integrated device electronics status reg.

Single Sector WRITE in PIO mode:

1. Write task file registers with appropriate values for Cyl, Hd, Sector, and write or read commanded.
2. Wait for DRQ to be set in task file status register.
3. Write any data originating from microcontroller 170, such as logical block access, to drive.
4. Load enhanced integrated device electronics counter with WORD count of enhanced integrated device electronics words to transfer. 00=256 words/512 bytes.
5. Load enhanced integrated device electronics control register with value of 03h(XFR REQ & XFR DIR). (This starts the enhanced integrated device electronics transfer to drive).
6. Wait for enhanced integrated device electronics status register bit 00 to be set (XFR OVR). If bit 01 (XFR ERR) is set, an error, in read/compare only, has occurred).
7. Clear enhanced integrated device electronics control register bit 00 (XFR REQ), and bits 00 and 01 (if error) of enhanced integrated device electronics status register will clear.
8. Interrogate task file registers to verify proper completion of command.

Multiple Sector WRITE in PIO mode.

1. Repeat steps 1-7 of single sector write operation above.
2. Manage FIFO 174 if required, to re-transmit data that was in previous sector.
3. Repeat steps 2 through 7 of single sector write operation above, for each sector of the multi-sector write operation.
4. After last sector transfer is completed, repeat step 8 of the single sector write operation above.

Single Sector READ in PIO mode.

1. Write task file registers with appropriate values for Cyl, Hd, Sector, and write or read command.
2. Wait for DRQ to be set in task file status register.
3. Load enhanced integrated device electronics counter with WORD count of enhanced integrated device electronics words to transfer. 00=256 words/512 bytes.
4. Load enhanced integrated device electronics control register with value of 041 h (CAPTURE & XFR REQ) if the data read from the drive is to be captured in the FIFO 174; if no capture is desired then a value of 01 h is written; this starts the enhanced integrated device electronics transfer to drive.
5. Wait for enhanced integrated device electronics status register bit 00 to be set (XFR OVR). If bit 01 (XFR ERR) is set, an error, in read/compare only, has occurred.
6. Clear enhanced integrated device electronics control register bit 00 (XFR REQ), and bits 00 and 01 (if error) of enhanced integrated device electronics status register will clear.
7. Interrogate task file registers to verify proper completion of command.
8. If no error has occurred, and the CAPTURE was on, the FIFO 174 will be reloaded with the data that was read from the drive. If an error occurred, the microcontroller 170 can then read the FIFO 174 to determine the error location and type.

Multiple Sector READ in PIO mode.

1. Repeat steps 1-8 of single sector read operation above.
2. Manage FIFO 174 if required, to retransmit data that was in previous sector.
3. Repeat steps 2 through 6 of single sector write operation above, for each sector of the multi-sector read operation.
4. After last sector transfer is completed, repeat steps 7 & 8 of the single sector read operation above.

Single/Multiple Sector READ/WRITE in DMA mode.

DMA mode, from a user standpoint, differs from PIO mode only in that an additional bit, b02 (XFR TYPE) in the enhanced integrated device electronics control register must be set to effect the DMA mode.

FIFO 174 management is the biggest factor in enhanced integrated device electronics operation. Once data is written to the FIFO 174, it remains in the FIFO 174 until the FIFO 174 is reset by b04 of the enhanced integrated device electronics control reg. For every enhanced integrated device electronics read or write, the FIFO 174 is incremented to the next word. For a single or multiple sector read or write, wherein the same data is to be written/read to the drive, the microcontroller 170 need only load the single sector of data. At the end of the sector, the microcontroller 170 can force the FIFO 174 read pointer to the beginning of the FIFO 174 by setting/clearing b03 (RXMT) of the enhanced integrated device electronics control register.

If in a read/capture mode, an error occurs, the FIFO 174 will have to be reloaded by the microcontroller 170 since the errored data will now be in the FIFO 174. This reload must occur from the beginning since the microcontroller 170 cannot address any particular word of the FIFO 174.

Referring now to FIG. 13, the integrated test system of the present invention is shown. According to the preferred embodiment of the present invention, the integrated test system comprises a rack 100 configured to mount and electrically connect 120 disk drives within slots 102 formed therein.

Further, according to the preferred embodiment of the present invention, the integrated test system comprises at least one, preferably two, hand held terminals 104 for facilitating operation thereof.

At least one, preferably two, PENTIUM (a federally registered trademark of Intel, Inc. of Santa Clara, Calif.) class personal computers 106 are mounted within the rack 100 to facilitate testing of the 120 drives-under-test 162 contained therein. The rack 100 preferably comprises wheels 101 to facilitate easy movement thereof. A bar code reader 108 allows the operator to enter the identification code from the bar code sticker applied to each drive, if desired.

A local area network, preferably an ETHERNET (a federally registered trademark of Xerox Corporation of Stamford, Conn.), provides electrical communication to a host computer 110 which may host a plurality of such integrated test systems. Statistical process control, comprising statistical analysis 66, is preferably performed by the host computer 108.

The time required for the handling of a disk drive for both the contemporary manufacturing methodology (comprising a separate IDT, intelligent burn-in, and final test) and the present invention (which utilizes a single integrated test) are tabulated in the tables below.

| HANDLING TIME FOR CONTEMPORARY DISK DRIVE MANUFACTURING METHODOLOGY | |
| --- | --- |
| HDA | 30 SEC/DRIVE |
| TRAY LOAD | 14.2 SEC/DRIVE |
| IBI | 6.4 SEC/DRIVE |
| OFF LOAD TRAY TO CONVEYOR | 16.2 SEC/DRIVE |
| FTS | 27 SEC/DRIVE |
| TOTAL | 93.8 SEC/DRIVE or 187.6 MINUTES/120 DRIVES |

| HANDLING TIME FOR DISK DRIVE MANUFACTURING METHODOLOGY ACCORDING TO THE PRESENT INVENTION | |
| --- | --- |
| LOAD TO TROLLEY | 10 SEC/DRIVE |
| LOAD/UNLOAD TO INTEGRATED TEST SYSTEM | 23 SEC/DRIVE |
| UNLOAD TO CONVEYOR | 5 SEC/DRIVE |
| TOTAL | 38 SEC/DRIVE or 76 MINUTES/120 DRIVES |

Thus, as clearly shown, use of the integrated test system of the present invention results in a reduction of 55.8 seconds per drive (0.93 minutes/drive). At a production rate of 100,000 drives per day, the present invention results in a time savings of 93,000 minutes per day (1,550 hours per day). This is equivalent to the labor of approximately 194 operators (1,550 hours per day) 8 hours per day=193.7 operators). As such, it will be appreciated that the method for manufacturing a disk drive of the present invention does, indeed, represent a substantial labor savings with respect to contemporary manufacturing methodology.

It is further respectfully submitted that the present invention substantially reduces the amount of floor space required for the manufacture of disk drives. The integrated test system of the present invention occupies a floor space of approximately four square feet and replaces contemporary test stations occupying a total of approximately fifty square feet. In one implementation, the integrated test system of the present invention was found to approximately double the manufacturing capacity of a disk drive manufacturing facility.

It is understood that the exemplary method for manufacturing a disk drive described herein and shown in the drawings represents only a presently preferred embodiment of the invention. Indeed, various modifications and additions may be made to such embodiment without departing from the spirit and scope of the invention. For example, various different configurations of the integrated test system are contemplated. Thus, the rack which both holds the drives-under-test 162 may be configured so as to be stationary, rather than movable. Additionally, the capacity of the rack may be increased, so as to facilitate the simultaneous testing of a larger number of drives-under-test 162, as desired. Further, the integrated test system of the present invention may be configured so as to perform various different tests upon the disk drives, as desired.

Thus, these and other modifications and additions may be obvious to those skilled in the art and may be implemented to adapt the present invention for use in a variety of different applications.

We claim:

1. A method for manufacturing a disk drive, the disk drive comprising a head disk assembly and a controller printed circuit board assembly (PCBA), the method comprising the steps of:

a) while in a clean room:
i) assembling the head disk assembly;
ii) performing servo writing upon the head disk assembly;

b) connecting the head disk assembly to a test controller to perform a head disk assembly test upon the head disk assembly;

c) connecting the head disk assembly to the controller PCBA to form a drive-under-test;

d) transporting the drive-under-test to an integrated test system and electrically connecting the drive-under-test to the integrated test system, the integrated test system configured to perform a plurality of manufacturing tests comprising an initial drive test an intelligent burn-in test and a final test to substantially reduce handling of the drive-under test during and between each of the manufacturing tests, the initial drive test including a least one of a power-on test and a check for drive ready; and e) performing the manufacturing tests without removing the drive-under-test from the integrated test system at least between the initial drive test and the initial burn-in test, thereby enabling the initial burn-in to be performed without repeating portion of the initial drive test.

2. The method as recited in claim 1, wherein the integrated test system in mounted on wheels.

3. The method as recited in claim 1, wherein the performing step is carried out within about four square feet of manufacturing floor space.

4. The method as recited in claim 1, wherein the integrated test system is configured to perform the manufacturing test on at least 120 disk drives simultaneously.

5. A method for manufacturing a disk drive, the disk drive comprising a head disk assembly and a controller printed circuit board assembly (PCBA), the method comprising the steps of:

a) while in a clean room:
i) assembling the head disk assembly;
ii) performing servo writing upon the head disk assembly;

b) connecting the head disk assembly to a test controller to perform a head disk assembly test upon the head disk assembly;

c) connecting the head disk assembly to the controller PCBA to form a drive-under-test;

d) transporting the drive-under-test to an integrated test system and electrically connecting the drive-under-test to the integrated test system; and e) using the integrated test system, performing an initial drive test and an intelligent burn-in test, the intelligent burn in test being performed after the initial drive test without repeating a portion of the initial drive test;

wherein the initial drive test includes at least one of a power on test and a check for drive ready.

* * * * *